(12) United States Patent
Hu et al.

(10) Patent No.: US 10,575,246 B2
(45) Date of Patent: Feb. 25, 2020

(54) CAPABILITY MATCHING METHOD, APPARATUS, AND SYSTEM

(71) Applicant: Huawei Technologies Co., Ltd., Shenzhen (CN)

(72) Inventors: Zhenxing Hu, Shenzhen (CN); Yongqiang Gao, Beijing (CN); Wei Quan, Beijing (CN); Xiaodong Yang, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 15/080,309

(22) Filed: Mar. 24, 2016

(65) Prior Publication Data

US 2016/0205495 A1 Jul. 14, 2016

Related U.S. Application Data

(63) Continuation of application No. PCT/CN2013/087862, filed on Nov. 26, 2013.

(30) Foreign Application Priority Data

Sep. 26, 2013 (WO) ................ PCT/CN2013/084329

(51) Int. Cl.
*H04W 48/18* (2009.01)
*H04W 48/02* (2009.01)
(Continued)

(52) U.S. Cl.
CPC ............. *H04W 48/18* (2013.01); *H04W 4/70* (2018.02); *H04W 36/0022* (2013.01);
(Continued)

(58) Field of Classification Search
CPC ............ C07K 14/705; H04W 36/0022; H04W 36/0083; H04W 48/02; H04W 48/18;
(Continued)

(56) References Cited

U.S. PATENT DOCUMENTS

| 2009/0197603 A1* | 8/2009 | Ji ...................... H04W 36/0083 455/436 |
| 2011/0194510 A1* | 8/2011 | Gaal .................... H04L 5/0037 370/329 |

(Continued)

FOREIGN PATENT DOCUMENTS

| AL | 2592873 A1 | 5/2013 |
| CN | 101547487 A | 9/2009 |

(Continued)

OTHER PUBLICATIONS

What is MIB in LTE 4G; https://ltebasics.wordpress.conn/2013/07/03/what-is-mib-in-lte/?.*

(Continued)

*Primary Examiner* — Raj Jain
(74) *Attorney, Agent, or Firm* — Leydig, Voit & Mayer, Ltd.

(57) ABSTRACT

Embodiments of the present invention provide a capability matching method, an apparatus, and a system. The method includes: before a user equipment (UE) initiates a random access process, identifying, by the UE, a capability of a network side device, and when the UE identifies that the network side device is a network side device that does not support low cost machine type communication (LC-MTC), reselecting, by the UE, to access another network side device. By means of the capability matching method, the apparatus, and the system provided in the embodiments of the present invention, a problem that a capability mismatch occurs between a UE and a network side device is avoided, and a waste of authorized resources, extra power consump- (Continued)

---

A core network device generates reselection configuration information, where the reselection configuration information includes information about a network side device that supports LC-MTC — S301

The core network device sends the reselection configuration information to a UE, so that the UE preferentially selects the network side device in the reselection configuration information to perform access — S302 tion of a UE, and an interruption of data transmission are avoided.

4 Claims, 10 Drawing Sheets

(51) Int. Cl.
   *H04W 72/04* (2009.01)
   *H04W 36/00* (2009.01)
   *H04W 4/70* (2018.01)

(52) U.S. Cl.
   CPC ....... *H04W 36/0083* (2013.01); *H04W 48/02* (2013.01); *H04W 72/042* (2013.01); *H04W 72/048* (2013.01)

(58) Field of Classification Search
   CPC . H04W 4/005; H04W 72/042; H04W 72/048; H04L 1/0026; H04L 1/0031; H04L 5/023
   See application file for complete search history.

(56) References Cited

U.S. PATENT DOCUMENTS

| | | | | |
|---|---|---|---|---|
| 2013/0083753 A1* | 4/2013 | Lee | ........ | H04W 72/0453 370/329 |
| 2013/0121309 A1* | 5/2013 | Guo | ........ | H04W 4/70 370/331 |
| 2013/0136072 A1* | 5/2013 | Bachmann | ........ | H04W 4/70 370/329 |
| 2013/0136098 A1 | 5/2013 | Li et al. | | |
| 2013/0170347 A1 | 7/2013 | Zhang et al. | | |
| 2013/0182632 A1* | 7/2013 | Maeda | ........ | H04W 28/0205 370/312 |
| 2013/0301549 A1* | 11/2013 | Chen | ........ | H04W 4/90 370/329 |
| 2013/0343319 A1* | 12/2013 | Quan | ........ | H04W 48/08 370/329 |
| 2014/0094139 A1 | 4/2014 | Xu et al. | | |
| 2015/0181560 A1* | 6/2015 | Jamadagni | ........ | H04B 7/2621 370/329 |
| 2015/0245402 A1* | 8/2015 | Mochizuki | ........ | H04W 76/025 370/331 |
| 2016/0205495 A1* | 7/2016 | Hu | ........ | H04W 4/70 370/331 |

FOREIGN PATENT DOCUMENTS

| | | |
|---|---|---|
| CN | 101553013 A | 10/2009 |
| CN | 101795477 A | 8/2010 |
| CN | 102123135 A | 7/2011 |
| CN | 102413521 A | 4/2012 |
| CN | 102469556 A | 5/2012 |
| CN | 103181142 A | 6/2013 |
| CN | 103220660 A | 7/2013 |
| EP | 2469952 A2 | 6/2012 |
| JP | 2014522195 A | 8/2014 |
| JP | 2014531856 A | 11/2014 |
| RU | 2468515 C2 | 11/2012 |
| WO | 2012119477 A1 | 9/2012 |
| WO | WO 2012172315 A1 | 12/2012 |
| WO | 2013024643 A1 | 2/2013 |
| WO | 2013049768 A1 | 4/2013 |
| WO | 2013077235 A1 | 5/2013 |

OTHER PUBLICATIONS

"Discussion on new UE category/type for low cost MTC UE for LTE," 3GPP TSG RAN WG1 Meeting #74, R1-133017, Barcelona, Spain, 3$^{rd}$ Generation Partnership Project, Valbonne, France (Aug. 19-23, 2013).

"3$^{rd}$ Generation Partnership Project; Technical Specification Group Radio Access Network; Evolved Universal Terrestrial Radio Access (E-UTRA); User Equipment (UE) procedures in idle mode (Release 11)," 3GPP TS 36.304, V11.5.0, pp. 1-34, 3$^{rd}$ Generation Partnership Project, Valbonne, France (Sep. 2013).

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.5.0, pp. 1-347, 3$^{rd}$ Generation Partnership Project, Valbonne, France (Sep. 2013).

IN/201627011097, First Examination Report, dated Nov. 27, 2019.

* cited by examiner

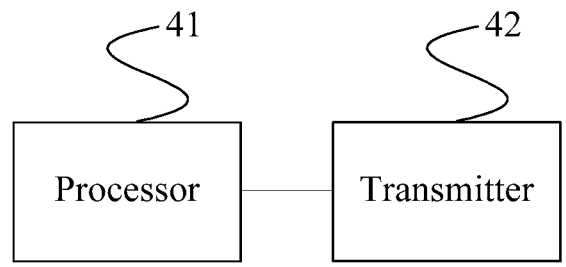

FIG. 8

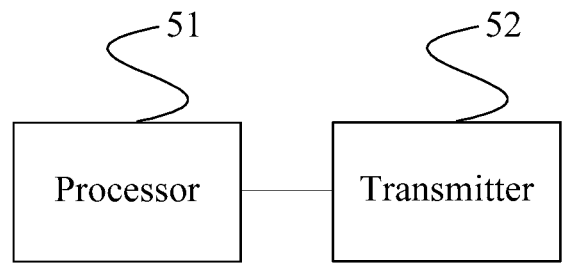

FIG. 9

| A network side device acquires capability indication information, where the capability indication information is used for indicating whether a neighboring cell of the network side device supports LC-MTC | S401 |

| The network side device sends a broadcast message to UE, where the broadcast message includes the capability indication information, so that when a UE that supports LC-MTC in the network side device performs cell reselection measurement in an idle state, the UE measures, according to the capability indication information, only a cell that supports LC-MTC | S402 |

FIG. 10

A second network side device receives a handover request message sent by a first network side device, where the handover request message carries indication information that a UE is a UE that supports LC-MTC — S801

According to the indication information, the second network side device returns a handover request acknowledgment message when LC-MTC is supported, or returns a handover request failure message when LC-MTC is not supported — S802

FIG. 16

A first network side device receives a measurement report message sent by a UE that supports LC-MTC — S901

The first network side device performs determination according to the measurement report message, and when it is determined to perform a handover to a second network side device, sends a handover request message to the second network side device — S902

According to the indication information, the second network side device returns a handover request acknowledgment message when LC-MTC is supported, or returns a handover request failure message when LC-MTC is not supported — S903

FIG. 17

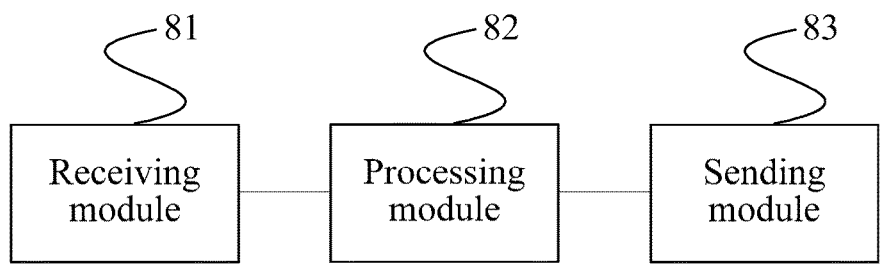

FIG. 18

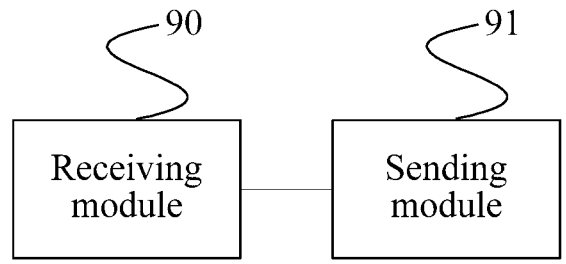

FIG. 24

A network side device generates measurement configuration information, where the measurement configuration information includes a cell identifier that LC-MTC is not supported — S1301

The network side device sends the measurement configuration information to a UE, so that the UE skips performing measurement on a cell corresponding to the cell identifier that LC-MTC is not supported included in the measurement configuration information — S1302

FIG. 25

A UE receives measurement configuration information sent by a network side device, where the measurement configuration information includes a cell identifier that LC-MTC is not supported — S1401

The UE skips performing measurement on a cell corresponding to the cell identifier that LC-MTC is not supported included in the measurement configuration information — S1402

FIG. 26

CAPABILITY MATCHING METHOD, APPARATUS, AND SYSTEM

CROSS-REFERENCE

This application is a continuation of International Patent Application No. PCT/CN2013/087862, filed on Nov. 26, 2013, which claims priority to International Patent Application No. PCT/CN2013/084329, filed on Sep. 26, 2013, both of which are hereby incorporated by reference in there entireties.

TECHNICAL FIELD

Embodiments of the present invention relate to the field of communications technologies, and in particular, to a capability matching method, an apparatus, and a system.

BACKGROUND

User equipment (UE) that supports low cost machine type communication (LC-MTC) is a special type of UE, has lower costs as compared with an ordinary UE, and has features including: (1) a single radio-frequency receive chain; (2) an uplink/downlink transport block is less than 1000 bits; and (3) only baseband data in a 1.4 M bandwidth can be received.

A process that a UE accesses a network in the prior art is: The UE receives a physical broadcast channel (PBCH) and a physical downlink shared channel (PDSCH) from a base station, and separately acquires a master information block (MIB) from the PBCH, and acquires a system information block (SIB) from the PDSCH; next, the UE initiates a random access process based on the MIB and the SIB, and after access succeeds, the UE performs subsequent signaling transmission and data transmission.

In the prior art, a UE in an idle state performs cell reselection when quality of service of a current cell of the UE is lower than a particular threshold, and when a service needs to be received or sent, the UE establishes a connection to a network, and then receives or sends data.

In the prior art, when a UE in a connected state performs measurement according to a measurement configuration on a network side, and reports a measurement result to a network side device, and when the network side device determines, based on the measurement result, that a handover condition is met, the network side device instructs the UE to be handed over to another cell.

There may be a cell that does not support LC-MTC (for example, a cell a cell belonging to an existing base station that is not upgraded) in a network, and therefore: 1. According to an existing random access process, a UE that supports LC-MTC may be selected to such a cell, and then attempts to perform data exchange with a network side according to the foregoing procedure, and in a process of the data exchange, if a scheduled PDSCH transmission resource exceeds 1.4 M, or an uplink/downlink transport block is greater than 1000 bits, a problem of a capability mismatch with the UE may occur. 2. According to an existing cell reselection process, if a UE that supports LC-MTC is reselected to a cell that does not support LC-MTC, and in a process of establishing a connection or receiving or sending data, if a scheduled PDSCH transmission resource exceeds 1.4 M, or an uplink/downlink transport block is greater than 1000 bits, a problem of a capability mismatch with the UE may also occur. 3. According to an existing cell handover process, if a UE that supports LC-MTC handed over to a cell that does not support LC-MTC, and if it occurs that a scheduled PDSCH transmission resource exceeds 1.4 M, or an uplink/downlink transport block greater than 1000 bits, a problem of a capability mismatch with the UE may also occur. The foregoing three cases result in a waste of authorized resources and extra power consumption of the UE or an interruption of data transmission.

Therefore, how to better match capability of a UE with a cell is a problem that needs to be resolved.

SUMMARY

Embodiments of the present invention provide a capability matching method, an apparatus, and a system, so as to avoid a problem that a capability mismatch occurs between a UE and a network side device.

According to a first aspect, an embodiment of the present invention provides a capability matching method, including:
  before user equipment UE initiates a random access process, identifying, by the UE, a capability of a network side device; and
  when the UE identifies that the network side device is a network side device that does not support low cost machine type communication LC-MTC, reselecting, by the UE, to access another network side device.

In a first possible implementation manner of the first aspect, the identifying, by the UE, a capability of a network side device includes:
  determining, by the UE, whether a master information block MIB in a physical broadcast channel PBCH carries capability indication information, where the capability indication information includes:
  a capability indication that the network side device supports LC-MTC or a version number of the network side device.

With reference to the first aspect, in a second possible implementation manner of the first aspect, the identifying, by the UE, a capability of a network side device includes:
  determining, by the UE, whether a system information block SIB in a physical downlink shared channel PDSCH carries capability indication information, where the capability indication information includes any one or a combination of the following:
  a capability indication that the network side device supports LC-MTC;
  a version number of the network side device;
  an access type block parameter, where the access type block parameter includes an LC-MTC type and an access parameter corresponding to the LC-MTC type;
  an enhanced access type block parameter, where the enhanced access type block parameter includes an LC-MTC type and an access parameter corresponding to the LC-MTC type;
  a random access channel RACH channel configuration message, where the RACH channel configuration message includes LC-MTC type dedicated configuration information; and
  a physical random access channel PRACH channel configuration message, where the PRACH channel configuration message includes LC-MTC type dedicated configuration information.

With reference to the first aspect, in a third possible implementation manner of the first aspect, the identifying, by the UE, a capability of a network side device includes:
  determining, by the UE, whether any one of the following is met in received scheduling information:

a resource block scheduled by the scheduling information is greater than 1000 bits;

a downlink resource scheduled by the scheduling information is greater than a 1.4 MHz bandwidth; and a quantity of layers scheduled by the scheduling information is greater than 1.

With reference to the third possible implementation manner of the first aspect, in a fourth possible implementation manner of the first aspect, before the reselecting, by the UE, to access another network side device, the method further includes:

sending, by the UE, non-access stratum (NAS) signaling carrying a release request to a core network device, so that the core network device performs, after receiving the release request, a release procedure on a network side.

With reference to a fourth possible implementation manner of the first aspect, in a fifth possible implementation manner of the first aspect, after the sending, by the UE, non-access stratum NAS signaling carrying a release request to a core network device further includes:

receiving, by the UE, reselection configuration information sent by the core network device, where the reselection configuration information includes information about a network side device that supports LC-MTC; and the reselecting, by the UE, to access another network side device includes:

preferentially selecting, by the UE, the network side device in the reselection configuration information for access.

With reference to any one of the first aspect to the fifth possible implementation manner of the first aspect, in a sixth possible implementation manner of the first aspect, before the reselecting, by the UE, to access another network side device, the method further includes:

identifying, by the UE, the network side device as a forbidden network side device.

According to a second aspect, an embodiment of the present invention provides a capability matching method, including:

generating, by a network side device, capability indication information; and sending, by the network side device, the capability indication information to user equipment UE, so that when identifying that the network side device is a network side device that does not support low cost machine type communication LC-MTC, the UE reselects to access another network side device.

In a first possible implementation manner of the second aspect, the capability indication information is carried in a master information block MIB, and the capability indication information includes:

a capability indication that the network side device supports LC-MTC or a version number of the network side device.

With reference to the second aspect, in a second possible implementation manner of the second aspect, the capability indication information is carried in a system information block SIB, and the capability indication information includes any one or a combination of the following:

a capability indication that the network side device supports LC-MTC;

a version number of the network side device;

an access type block parameter, where the access type block parameter includes an LC-MTC type and an access parameter corresponding to the LC-MTC type;

an enhanced access type block parameter, where the enhanced access type block parameter includes an LC-MTC type and an access parameter corresponding to the LC-MTC type;

a random access channel (RACH) channel configuration message, where the RACH channel configuration message includes LC-MTC type dedicated configuration information; and a physical random access channel (PRACH) channel configuration message, where the PRACH channel configuration message includes LC-MTC type dedicated configuration information.

With reference to the second aspect, in a third possible implementation manner of the second aspect, the capability indication information is scheduling information, and the scheduling information meets any one of the following:

a resource block scheduled by the scheduling information is greater than 1000 bits;

a downlink resource scheduled by the scheduling information is greater than a 1.4 MHz bandwidth; and a quantity of layers scheduled by the scheduling information is greater than 1.

With reference to any one the method of the second aspect to the third possible implementation manner of the second aspect, in a fourth possible implementation manner of the second aspect, the method further includes:

sending, by the network side device, a setup request message or configuration update message to a core network device, where the setup request message or configuration update message carries an identifier of a network side device that supports LC-MTC, so that the core network device saves the identifier of the network side device that supports LC-MTC, and sends reselection configuration information including the identifier to the UE.

According to a third aspect, an embodiment of the present invention provides a capability matching method, including:

generating, by a core network device, reselection configuration information, where the reselection configuration information includes information about a network side device that supports low cost machine type communication LC-MTC; and sending, by the core network device, the reselection configuration information to user equipment UE, so that the UE preferentially selects the network side device in the reselection configuration information for access.

In a first possible implementation manner of the third aspect, the method further includes:

receiving, by the core network device, non-access stratum NAS signaling that is sent by the UE and carries a release request; and performing, by the core network device, a release procedure on a network side according to the NAS signaling.

With reference to the third aspect or the first possible implementation manner of the third aspect, in a second possible implementation manner of the third aspect, the generating, by a core network device, reselection configuration information includes:

receiving, by the core network device, a setup request message or configuration update message sent by the network side device, where the setup request message or configuration update message carries an identifier of the network side device that supports LC-MTC; and saving, by the core network device, the identifier of the network side device that supports LC-MTC, and generating the reselection configuration information including the identifier.

According to a fourth aspect, an embodiment of the present invention provides user equipment, including:
an identification module, configured to: before a random access process is initiated, identify a capability of a network side device; and
a selection access module, configured to: when the identification module identifies that the network side device is a network side device that does not support low cost machine type communication LC-MTC, reselect to access another network side device.

In a first possible implementation manner of the fourth aspect, the identification module is configured to:
determine whether a master information block MIB in a physical broadcast channel PBCH carries capability indication information, where the capability indication information includes:
a capability indication that the network side device supports LC-MTC or a version number of the network side device.

With reference to the fourth aspect, in a second possible implementation manner of the fourth aspect, the identification module is configured to:
determine whether a system information block SIB in a physical downlink shared channel PDSCH carries capability indication information, where the capability indication information includes any one or a combination of the following:
a capability indication that the network side device supports LC-MTC;
a version number of the network side device;
an access type block parameter, where the access type block parameter includes an LC-MTC type and an access parameter corresponding to the LC-MTC type;
an enhanced access type block parameter, where the enhanced access type block parameter includes an LC-MTC type and an access parameter corresponding to the LC-MTC type;
a random access channel RACH channel configuration message, where the RACH channel configuration message includes LC-MTC type dedicated configuration information; and
a physical random access channel PRACH channel configuration message, where the PRACH channel configuration message includes LC-MTC type dedicated configuration information.

With reference to the fourth aspect, in a third possible implementation manner of the fourth aspect, the identification module is configured to:
determine whether any one of the following is met in received scheduling information:
a resource block scheduled by the scheduling information is greater than 1000 bits;
a downlink resource scheduled by the scheduling information is greater than a 1.4 MHz bandwidth; and
a quantity of layers scheduled by the scheduling information is greater than 1.

With reference to the third possible implementation manner of the fourth aspect, in a fourth possible implementation manner of the fourth aspect, the user equipment further includes:
a sending module, configured to: before the selection access module reselects to access another network side device, send non-access stratum NAS signaling carrying a release request to a core network device, so that the core network device performs, after receiving the release request, a release procedure on a network side.

With reference to the fourth possible implementation manner of the fourth aspect, in a fifth possible implementation manner of the fourth aspect, the user equipment further includes:
a receiving module, configured to: after the sending module sends the non-access stratum NAS signaling carrying the release request to the core network device, receive reselection configuration information sent by the core network device, where the reselection configuration information includes information about a network side device that supports LC-MTC; where
the selection access module is configured to:
preferentially select the network side device in the reselection configuration information for access.

With reference to any one of the fourth aspect to the fifth possible implementation manner of the fourth aspect, in a sixth possible implementation manner of the fourth aspect, the selection access module is further configured to:
before reselecting to access another network side device, identify the network side device as a forbidden network side device.

According to a fifth aspect, an embodiment of the present invention provides a network side device, including:
a generation module, configured to generate capability indication information; and
a sending module, configured to send the capability indication information to user equipment UE, so that when identifying that the network side device is a network side device that does not support low cost machine type communication LC-MTC, the UE reselects to access another network side device.

In a first possible implementation manner of the fifth aspect, the capability indication information is carried in a master information block MIB, and the capability indication information includes:
a capability indication that the network side device supports LC-MTC or a version number of the network side device.

With reference to the fifth aspect, in a second possible implementation manner of the fifth aspect, the capability indication information is carried in a system information block SIB, and the capability indication information includes any one or a combination of the following:
a capability indication that the network side device supports LC-MTC;
a version number of the network side device;
an access type block parameter, where the access type block parameter includes an LC-MTC type and an access parameter corresponding to the LC-MTC type;
an enhanced access type block parameter, where the enhanced access type block parameter includes an LC-MTC type and an access parameter corresponding to the LC-MTC type;
a random access channel RACH channel configuration message, where the RACH channel configuration message includes LC-MTC type dedicated configuration information; and
a physical random access channel PRACH channel configuration message, where the PRACH channel configuration message includes LC-MTC type dedicated configuration information.

With reference to the fifth aspect, in a third possible implementation manner of the fifth aspect, the capability indication information is scheduling information, and the scheduling information meets any one of the following:
- a resource block scheduled by the scheduling information is greater than 1000 bits;
- a downlink resource scheduled by the scheduling information is greater than a 1.4 MHz bandwidth; and
- a quantity of layers scheduled by the scheduling information is greater than 1.

With reference to any one of the fifth aspect to the third possible implementation manner of the fifth aspect, in a fourth possible implementation manner of the fifth aspect, the sending module is further configured to:
- send a setup request message or configuration update message to a core network device, where the setup request message or configuration update message carries an identifier of a network side device that supports LC-MTC, so that the core network device saves the identifier of the network side device that supports LC-MTC, and sends reselection configuration information including the identifier to the UE.

According to a sixth aspect, an embodiment of the present invention provides a core network device, including:
- a generation module, configured to generate reselection configuration information, where the reselection configuration information includes information about a network side device that supports low cost machine type communication LC-MTC; and
- a sending module, configured to send the reselection configuration information to user equipment UE, so that the UE preferentially selects the network side device in the reselection configuration information for access.

In a first possible implementation manner of the sixth aspect, further including:
- a receiving module, configured to receive non-access stratum NAS signaling that is sent by the UE and carries a release request; and
- a processing module, configured to perform a release procedure on a network side according to the NAS signaling.

With reference to the sixth aspect or the first possible implementation manner of the sixth aspect, in a second possible implementation manner of the sixth aspect, the receiving module is further configured to:
- receive a setup request message or configuration update message sent by the network side device, where the setup request message or configuration update message carries an identifier of the network side device that supports LC-MTC; where
- the generation module is specifically configured to save the identifier of the network side device that supports LC-MTC, and generate the reselection configuration information including the identifier.

According to a seventh aspect, an embodiment of the present invention provides a communications system, including the user equipment according to any one of the fourth aspect to the sixth possible implementation manner of the fourth aspect, the network side device according to any one of the fifth aspect to the fourth possible implementation manner of the fifth aspect, and the core network device according to any one of the sixth aspect to the second possible implementation manner of the sixth aspect.

According to an eighth aspect, an embodiment of the present invention provides a capability matching method, including:
- acquiring, by a network side device, capability indication information, where the capability indication information is used for indicating whether a neighboring cell of the network side device of a current cell of user equipment UE supports low cost machine type communication LC-MTC; and
- sending, by the network side device, a broadcast message to user equipment UE, where the broadcast message includes the capability indication information, so that when a UE that supports an LC-MTC type in the network side device performs cell reselection measurement when the UE is in an idle state, the UE measures, according to the capability indication information, only a cell that supports LC-MTC, and when the UE that supports LC-MTC in the network side device performs cell reselection in an idle state, the UE performs reselection, according to the capability indication information, only to a cell that supports LC-MTC selects, according to the capability indication information, a cell that supports LC-MTC to camp on.

In a first possible implementation manner of the eighth aspect, the acquiring, by a network side device, capability indication information includes:
- in a process of establishing an X2 interface between the network side device and another network side device, exchanging, by the network side device and the another network side device, information about whether cells under respective coverage support LC-MTC.

According to a ninth aspect, an embodiment of the present invention provides a capability matching method, including:
- receiving, by user equipment UE, a broadcast message sent by a network side device, where the broadcast message includes capability indication information, and the capability indication information is used for indicating whether a neighboring cell of the network side device supports low cost machine type communication LC-MTC; and
- when the UE performs cell reselection measurement in an idle state, measuring, by the UE according to the capability indication information, only a cell that supports LC-MTC, and/or when the UE of an LC-MTC type performs cell reselection in an idle state, performing reselection, by the UE according to the capability indication information, performing reselection, by the UE according to the capability indication information, only to a cell that supports LC-MTC to camp on.

According to a tenth aspect, an embodiment of the present invention provides a network side device, including:
- an acquiring module, configured to acquire capability indication information, where the capability indication information is used for indicating whether a neighboring cell of the network side device supports low cost machine type communication LC-MTC; and
- a sending module, configured to send a broadcast message to user equipment UE, where the broadcast message includes the capability indication information, so that when a UE that supports LC-MTC in the network side device performs cell reselection measurement when the UE is in an idle state, the UE measures, according to the capability indication information, only a cell that supports LC-MTC, and when the UE that supports LC-MTC in the network side device performs cell reselection in an idle state, the UE performs reselection, according to the capability indication information, only to a cell that supports LC-MTC.

In a first possible implementation manner of the tenth aspect, the acquiring module is configured to:

in a process of establishing an X2 interface with another network side device, exchange information about whether cells under respective coverage support LC-MTC.

According to an eleventh aspect, an embodiment of the present invention provides user equipment, including:
  a receiving module, configured to receive a broadcast message sent by a network side device, where the broadcast message includes capability indication information about whether a neighboring cell of a current cell of the user equipment UE supports low cost machine type communication LC-MTC; and
  a processing module, configured to: when the UE performs cell reselection measurement in an idle state, measure, according to the capability indication information, only a cell that supports LC-MTC, and/or when the UE performs cell reselection in an idle state, perform reselection, according to the capability indication information, only to a cell that supports LC-MTC.

According to a twelfth aspect, an embodiment of the present invention provides a communications system, including the network side device according to the tenth aspect or the first possible implementation manner of the tenth aspect and the user equipment according to the eleventh aspect.

According to a thirteenth aspect, an embodiment of the present invention provides a capability matching method, including:
  receiving, by a first network side device, a measurement report message sent by user equipment UE that supports low cost machine type communication LC-MTC; and
  performing, by the first network side device, determination according to the measurement report message, and when it is determined to perform a handover to a second network side device, sending a handover request message to the second network side device, where the handover request message carries indication information that UE is a UE that supports LC-MTC, so that according to the indication information, the second network side device returns a handover request acknowledgment message when LC-MTC is supported, or returns a handover request failure message when LC-MTC is not supported.

According to a fourteenth aspect, an embodiment of the present invention provides a capability matching method, including:
  receiving, by a second network side device, a handover request message sent by a first network side device, where the handover request message carries indication information that UE is a UE that supports LC-MTC; and
  returning, by the second network side device according to the indication information, a handover request acknowledgment message when LC-MTC is supported, or returning a handover request failure message when LC-MTC is not supported.

According to a fifteenth aspect, an embodiment of the present invention provides a network side device, including:
  a receiving module, configured to receive a measurement report message sent by user equipment UE that supports low cost machine type communication LC-MTC;
  a processing module, configured to perform determination according to the measurement report message; and
  a sending module, configured to: when the processing module determines to perform a handover to a second network side device, send a handover request message to the second network side device, where the handover request message carries indication information that UE is a UE that supports LC-MTC, so that according to the indication information, the second network side device returns a handover request acknowledgment message when LC-MTC is supported, or returns a handover request failure message when LC-MTC is not supported.

According to a sixteenth aspect, an embodiment of the present invention provides a network side device, including:
  a receiving module, configured to receive a handover request message sent by a first network side device, where the handover request message carries indication information that UE is a UE that supports LC-MTC; and
  a processing module, configured to, according to the indication information, return a handover request acknowledgment message when LC-MTC is supported, or return a handover request failure message when LC-MTC is not supported.

According to a seventeenth aspect, an embodiment of the present invention provides a capability matching method, including:
  receiving, by a first network side device, a measurement report message sent by user equipment UE that supports low cost machine type communication LC-MTC;
  performing, by the first network side device, determination according to the measurement report message, and when it is determined to perform a handover to a second network side device, sending a handover request message to the second network side device, so that according to the handover request message, the second network side device returns a handover request acknowledgment message to the first network side device, where the handover request acknowledgment message carries indication information about whether the second network side device supports LC-MTC; and
  continuing, by the first network side device according to the indication information carried in the handover request acknowledgment message, to hand over the UE that supports LC-MTC to the second network side device, or, when it is determined that the second network side device does not support LC-MTC, returning a handover cancel message.

According to an eighteenth aspect, an embodiment of the present invention provides a capability matching method, including:
  receiving, by a second network side device, a handover request message sent by a first network side device; and
  returning, by the second network side device, a handover request acknowledgment message to the first network side device according to the handover request message, where the handover request acknowledgment message carries indication information about whether the second network side device supports low cost machine type communication LC-MTC, so that the first network side device continues, according to the indication information carried in the handover request acknowledgment message, to hand over the UE that supports LC-MTC to the second network side device, or when it is determined that the second network side device does not support LC-MTC, returns a handover cancel message.

According to a nineteenth aspect, an embodiment of the present invention provides a network side device, including:

a receiving module, configured to receive a measurement report message sent by user equipment UE that supports low cost machine type communication LC-MTC;
a processing module, configured to perform determination according to the measurement report message; and
a sending module, configured to: when the processing module determines to perform a handover to a second network side device, send a handover request message to the second network side device, so that the second network side device returns a handover request acknowledgment message to the first network side device according to the handover request message, where the handover request acknowledgment message carries indication information about whether the second network side device supports low cost machine type communication LC-MTC; where
the processing module is further configured to continue, according to the indication information carried in the handover request acknowledgment message, to hand over the UE that supports LC-MTC to the second network side device, or, when the second network side device does not support LC-MTC, return a handover cancel message.

According to a twentieth aspect, an embodiment of the present invention provides a network side device, including:
a receiving module, configured to receive a handover request message sent by a first network side device; and
a sending module, configured to return a handover request acknowledgment message to the first network side device according to the handover request message, where the handover request acknowledgment message carries indication information about whether a second network side device supports low cost machine type communication LC-MTC, so that the first network side device continues, according to the indication information carried in the handover request acknowledgment message, to hand over UE that supports LC-MTC to the second network side device, or when the second network side device does not support LC-MTC, returns a handover cancel message.

According to a twenty-first aspect, an embodiment of the present invention provides a capability matching method, including:
generating, by a network side device, measurement configuration information, where the measurement configuration information includes a cell identifier that low cost machine type communication LC-MTC is not supported; and
sending, by the network side device, the measurement configuration information to user equipment UE, so that the UE skips performing measurement on a cell corresponding to the cell identifier that LC-MTC is not supported included in the measurement configuration information.

In a first possible implementation manner of the twenty-first aspect, before the generating, by a network side device, measurement configuration information, the method further includes:
receiving, by the network side device, indication information sent by UE, where the indication information is used for indicating whether the UE is a UE that supports LC-MTC.

According to a twenty-second aspect, an embodiment of the present invention provides a capability matching method, including:
receiving, by user equipment UE, measurement configuration information sent by a network side device, where the measurement configuration information includes a cell identifier that low cost machine type communication LC-MTC is not supported; and
skipping, by the UE, performing measurement on a cell corresponding to the cell identifier that LC-MTC is not supported included in the measurement configuration information.

In a first possible implementation manner of the twenty-second aspect, before the receiving, by user equipment UE, measurement configuration information sent by a network side device, the method further includes:
sending, by the UE, indication information to the network side device, where the indication information is used for indicating whether the UE is a UE that supports LC-MTC.

According to a twenty-third aspect, an embodiment of the present invention provides a network side device, including:
a generation module, configured to generate measurement configuration information, where the measurement configuration information includes a cell identifier that low cost machine type communication LC-MTC is not supported; and
a sending module, configured to send the measurement configuration information to user equipment UE, so that the UE skips performing measurement on a cell corresponding to the cell identifier that LC-MTC is not supported included in the measurement configuration information.

In a first possible implementation manner of the twenty-third aspect, the network side device further includes:
a receiving module, configured to: before the generation module generates the measurement configuration information, receive indication information sent by UE, where the indication information is used for indicating that the UE is a UE that supports LC-MTC.

According to a twenty-fourth aspect, an embodiment of the present invention provides user equipment, including:
a receiving module, configured to receive measurement configuration information sent by a network side device, where the measurement configuration information includes a cell identifier that low cost machine type communication LC-MTC is not supported; and
a processing module, configured to skip performing measurement on a cell corresponding to the cell identifier that LC-MTC is not supported included in the measurement configuration information.

In a first possible implementation manner of the twenty-fourth aspect, the user equipment further includes:
a sending module, configured to: before the receiving module receives the measurement configuration information sent by the network side device, send indication information to the network side device, where the indication information is used for indicating that the UE is a UE that supports LC-MTC.

According to a twenty-fifth aspect, an embodiment of the present invention provides a communications system, including the network side device according to the twenty-third aspect or the first possible implementation manner of the twenty-third aspect and the user equipment according to the twenty-fourth aspect or the first possible implementation manner of the twenty-fourth aspect.

In the capability matching method, the apparatus, and the system provided in the embodiments of the present invention, before initiating a random access process, a UE identifies a capability of a network side device, and when identifying that a network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 8 is a schematic structural diagram of Embodiment 2 of a network side device according to the present disclosure;

FIG. 9 is a schematic structural diagram of Embodiment 2 of a core network device according to the present disclosure;

FIG. 10 is a flowchart of Embodiment 4 of a capability matching method according to the present disclosure;

FIG. 16 is a flowchart of Embodiment 8 of a capability matching method according to the present disclosure;

FIG. 17 is a flowchart of interaction of Embodiment 9 of a capability matching method according to the present disclosure;

FIG. 18 is a schematic structural diagram of Embodiment 4 of a network side device according to the present disclosure;

FIG. 24 is a schematic structural diagram of Embodiment 7 of a network side device;

FIG. 25 is a flowchart of Embodiment 13 of a capability matching method according to the present disclosure;

FIG. 26 is a flowchart of Embodiment 14 of a capability matching method according to the present disclosure;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present disclosure.

Figure 1:
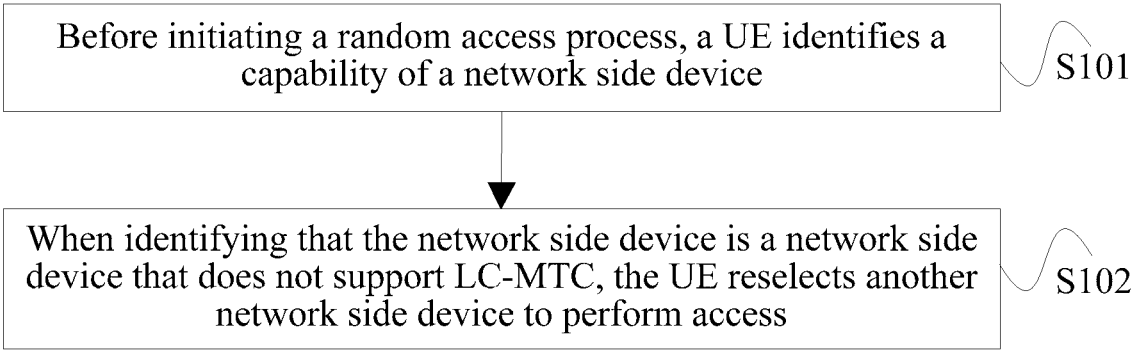
FIG. 1 is a flowchart of Embodiment 1 of a capability matching method according to the present disclosure.

FIG. 1 is a flowchart of Embodiment 1 of a capability matching method according to the present disclosure. In this embodiment, an example in which a UE executes the method is used for description. As shown in FIG. 1, the method in this embodiment may include:

S101: Before initiating a random access process, the UE identifies a capability of a network side device.

S102: When identifying that the network side device is a network side device that does not support LC-MTC, the UE reselects to access another network side device.

The network side device may be a base station, a multicast control entity, or the like. The UE identifies a capability of the network side device in three possible implementation manners:

1. After receiving a PBCH from the network side device, the UE reads a master information block (MIB) from the PBCH, and the UE determines whether the MIB carries capability indication information, where the capability indication information includes: a capability indication that the network side device supports LC-MTC or a version number of the network side device. If the UE determines that the MIB does not carry capability indication information, the UE identifies that the network side device is a network side device that does not support LC-MTC, and the UE reselects to access another network side device.

2. After receiving a PDSCH from the network side device, the UE acquires a system information block (SIB) from the PDSCH, and the UE determines whether the SIB carries capability indication information, where the capability indication information includes any one or a combination of the following: a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a random access channel (RACH) channel configuration message, where the RACH channel configuration message includes LC-MTC type dedicated configuration information; and a physical random access channel (PRACH) channel configuration message, where the PRACH channel configuration message includes LC-MTC type dedicated configuration information. If the UE determines that the SIB does not carry capability indication information, the UE identifies that the network side device is a network side device that does not support LC-MTC, and the UE reselects to access another network side device.

3. The UE receives, according to an existing access procedure, a broadcast message sent by the network side device, and then performs a random access process. If the random access process succeeds, the UE turns to a connected state. The UE then continues to receive scheduling information sent by the network side device, and the UE determines whether any one of the following is met in received scheduling information:

a resource block scheduled by the scheduling information is greater than 1000 bits; a downlink resource scheduled by the scheduling information is greater than a 1.4 MHz bandwidth; and a quantity of layers scheduled by the scheduling information is greater than 1.

If the scheduling information meets any one of the foregoing, the UE identifies that the network side device is a network side device that does not support LC-MTC, and the UE reselects to access another network side device.

In the third possible implementation manner, furthermore, before the UE identifies, according to the received scheduling information, that the network side device is a network side device that does not support LC-MTC, and reselects to access another network side device, the method may further include:

sending, by the UE, non-access stratum (NAS) signaling carrying a release request to a core network device, so that the core network device performs, after receiving the release request, a release procedure on a network side; after the release procedure ends, the UE reselect to access another network side device; in this way, synchronization between a network side device and the UE may be implemented, thereby avoiding a waste of resources.

Furthermore, after the sending, by the UE, NAS signaling carrying a release request to a core network device, the method may further include:

receiving, by the UE, reselection configuration information sent by the core network device, where the reselection configuration information includes information about a network side device that supports LC-MTC; the reselecting, by the UE, to access another network side device includes: preferentially selecting, by the UE, the network side device in the reselection configuration information for access; in this way, the UE may be prevented from another reselecting a network side device that does not support LC-MTC.

Specifically, as for how the core network device acquires information about a network side device that supports LC-MTC, a possible implementation manner is: When a network side device sends a setup request message or configuration update message to the core network device, an identifier of a network side device that supports LC-MTC is carried in the setup request message or configuration update message, and after receiving the setup request message or configuration update message, the core network device saves the identifier of the network side device that supports LC-MTC, so as to subsequently send the reselection configuration information including the identifier to a UE.

In the foregoing three possible implementation manners, furthermore, before the reselecting, by the UE, to access another network side device, the method further includes: identifying, by the UE, the identified network side device that does not support LC-MTC as a forbidden network side device, so as to avoid randomly accessing the network side device again.

In the capability matching method provided in this embodiment, before initiating a random access process, a UE identifies a capability of a network side device, and when identifying that the network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

Figure 2:
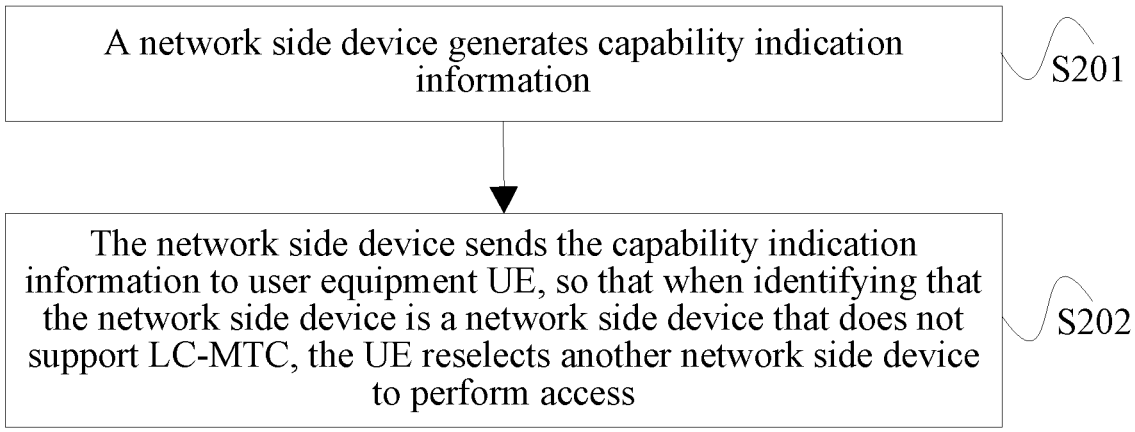
FIG. 2 is a flowchart of Embodiment 2 of a capability matching method according to the present disclosure.

FIG. 2 is a flowchart of Embodiment 2 of a capability matching method according to the present disclosure. In this embodiment, an example in which a network side device executes the method is used for description. As shown in FIG. 2, the method in this embodiment may include:

S201: The network side device generates capability indication information.

S202: The network side device sends the capability indication information to user equipment UE, so that when identifying that the network side device is a network side device that does not support LC-MTC, the UE reselects to access another network side device.

Specifically, there are three possible implementation manners:

1. The capability indication information is carried in a MIB, where the capability indication information includes: a capability indication that the network side device supports LC-MTC or a version number of the network side device.

2. The capability indication information is carried in a SIB, where the capability indication information includes any one or a combination of the following:

a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a RACH channel configuration message, where the RACH channel configuration message includes LC-MTC type dedicated configuration information; and a PRACH channel configuration message, where the PRACH channel configuration message includes LC-MTC type dedicated configuration information.

3. The capability indication information is scheduling information, where the scheduling information meets any one of the following:

a resource block scheduled by the scheduling information is greater than 1000 bits; a downlink resource scheduled by the scheduling information is greater than a 1.4 MHz bandwidth; and a quantity of layers scheduled by the scheduling information is greater than 1.

In the third possible implementation manner, furthermore, the method further includes:

sending, by the network side device, a setup request message or configuration update message to the core network device, where the setup request message or configuration update message carries an identifier of a network side device that supports LC-MTC, so that the core network device saves the identifier of the network side device that supports LC-MTC, and sends reselection configuration information including the identifier to the UE.

In the capability matching method provided in this embodiment, a network side device generates capability indication information and sends the capability indication information to a UE, so that before initiating a random access process, the UE identifies a capability of the network side device, and when identifying that the network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

Figure 3:
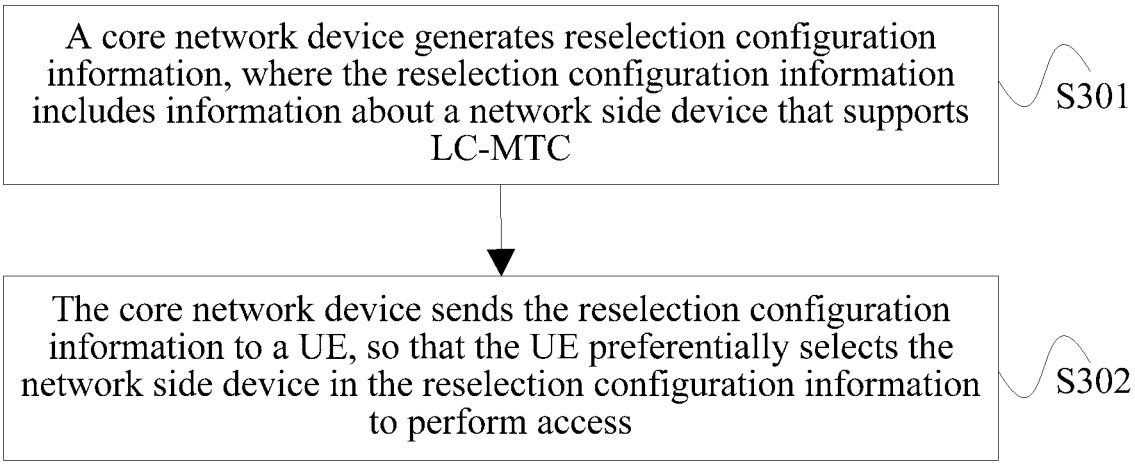
FIG. 3 is a flowchart of Embodiment 3 of capability matching according to the present disclosure.

FIG. 3 is a flowchart of Embodiment 3 of capability matching according to the present disclosure. As shown in FIG. 3, in this embodiment, an example in which a core network device executes the method is used for description. The method in this embodiment may include:

S301: A core network device generates reselection configuration information, where the reselection configuration information includes information about a network side device that supports LC-MTC.

S302: The core network device sends the reselection configuration information to a UE, so that the UE preferentially selects the network side device in the reselection configuration information for access.

Furthermore, the method in this embodiment further may include:

receiving, by the core network device, NAS signaling that is sent by the UE and carries a release request.

The core network device performs a release procedure on a network side according to the NAS signaling. A process that the core network device sends the reselection configuration information to the UE may occur after the NAS signaling carrying the release request is received, or may be in the middle of a process of the release procedure on the network side. The operation may implement synchronization between a network side device and the UE, thereby avoiding a waste of resources.

Specifically, as for how the core network device acquires information about a network side device that supports LC-MTC, a possible implementation manner is: When a network side device sends a setup request message or configuration update message to the core network device, an identifier of a network side device that supports LC-MTC is carried in the setup request message or configuration update message, and after receiving the setup request message or configuration update message, the core network device saves the identifier of the network side device that supports LC-MTC, and generates the reselection configuration information including the identifier, so as to subsequently send the reselection configuration information including the identifier to the UE.

In the capability matching method provided in this embodiment, a core network device generates reselection configuration information including information about a network side device that supports LC-MTC, and next, sends the reselection configuration information to a UE, so that the UE preferentially selects the network side device in the reselection configuration information for access. In this way, the UE may be prevented from reselection to a network side device that does not support LC-MTC. Therefore, a problem that a capability mismatch occurs between a UE and a network side device is avoided, and a waste of authorized resources, extra power consumption of a UE, and an interruption of data transmission are avoided.

Figure 4:
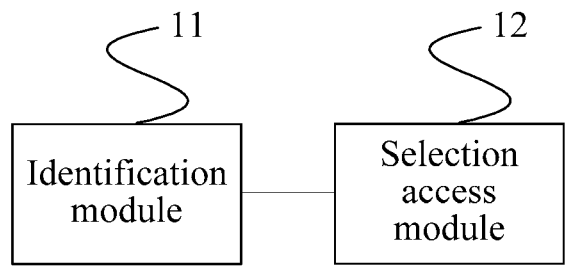
FIG. 4 is a schematic structural diagram of Embodiment 1 of user equipment according to the present disclosure.

FIG. 4 is a schematic structural diagram of Embodiment 1 of user equipment according to the present disclosure. As shown in FIG. 4, the user equipment in this embodiment may include an identification module 11 and a selection access module 12. The identification module 11 is configured to: before a random access process is initiated, identify a capability of a network side device. The selection access module 12 is configured to: when the identification module identifies that the network side device is a network side device that does not support low cost machine type communication LC-MTC, reselect to access another network side device.

In a first possible implementation manner, the identification module 11 is configured to determine whether a master information block MIB in a physical broadcast channel PBCH carries capability indication information, where the capability indication information includes: a capability indication that the network side device supports LC-MTC or a version number of the network side device.

In a second possible implementation manner, the identification module 11 is configured to determine whether a system information block SIB in a physical downlink shared channel (PDSCH) carries capability indication information, where the capability indication information includes any one or a combination of the following: a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a random access channel RACH channel configuration message, where the RACH channel configuration message includes LC-MTC type dedicated configuration information; and a physical random access channel PRACH channel configuration message, where the PRACH channel configuration message includes LC-MTC type dedicated configuration information.

In a third possible implementation manner, the identification module 11 is configured to determine whether any one of the following is met in received scheduling information:

a resource block scheduled by the scheduling information is greater than 1000 bits; a downlink resource scheduled by the scheduling information is greater than a 1.4 MHz bandwidth; and a quantity of layers scheduled by the scheduling information is greater than 1.

Furthermore, the user equipment further includes a sending module. The sending module is configured to: before the selection access module reselects to access another network side device, send NAS signaling carrying a release request to a core network device, so that the core network device performs, after receiving the release request, a release procedure on a network side.

Furthermore, the user equipment further includes a receiving module. The receiving module is configured to: after the sending module sends the NAS signaling carrying the release request to the core network device, receive reselection configuration information sent by the core network device, where the reselection configuration information includes information about a network side device that supports LC-MTC. The selection access module 12 is configured to preferentially select the network side device in the reselection configuration information for access.

In the foregoing implementation, the selection access module 12 is further configured to: before reselecting to access another network side device, identify the network side device as a forbidden network side device.

The user equipment in this embodiment may be configured to perform a technical solution in the embodiment of the method shown in FIG. 1, and has a similar implementation principle, which is no longer elaborated herein.

In the user equipment provided in this embodiment, before a random access process is initiated, an identification module identifies a capability of a network side device, and when the UE identifies that the network side device is a network side device that does not support LC-MTC, a selection access module reselects to access another network side device. In this way, a problem that a capability mismatch occurs between a UE and a network side device is avoided, and a waste of authorized resources, extra power consumption of a UE, and an interruption of data transmission are avoided.

Figure 5:
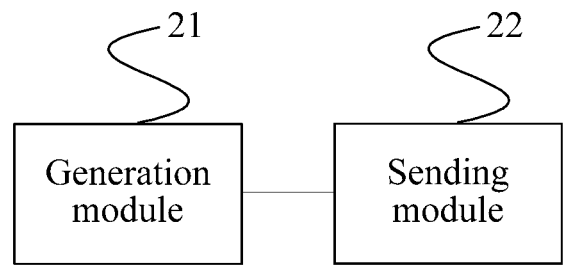
FIG. 5 is a schematic structural diagram of Embodiment 1 of a network side device according to the present disclosure.

FIG. 5 is a schematic structural diagram of Embodiment 1 of a network side device according to the present disclosure. As shown in FIG. 5, the network side device in this embodiment may include a generation module 21 and a sending module 22. The generation module 21 is configured to generate capability indication information. The sending module 22 is configured to send the capability indication information to user equipment UE, so that when identifying that the network side device is a network side device that does not support low cost machine type communication LC-MTC, the UE reselects to access another network side device.

In a first possible implementation manner, the capability indication information is carried in a master information block MIB, where the capability indication information includes: a capability indication that the network side device supports LC-MTC or a version number of the network side device.

In a second possible implementation manner, the capability indication information is carried in a system information block SIB, where the capability indication information includes any one or a combination of the following:
  a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a RACH channel configuration message, where the RACH channel configuration message includes LC-MTC type dedicated configuration information; and a PRACH channel configuration message, where the PRACH channel configuration message includes LC-MTC type dedicated configuration information.

In a third possible implementation manner, the capability indication information is scheduling information, where the scheduling information meets any one of the following:
  a resource block scheduled by the scheduling information is greater than 1000 bits; a downlink resource scheduled by the scheduling information is greater than a 1.4 MHz bandwidth; and a quantity of layers scheduled by the scheduling information is greater than 1.

In the foregoing embodiment, the sending module 22 is further configured to send a setup request message or configuration update message to a core network device, where the setup request message or configuration update message carries an identifier of a network side device that supports LC-MTC, so that the core network device saves the identifier of the network side device that supports LC-MTC, and sends reselection configuration information including the identifier to the UE.

The network side device in this embodiment may be configured to perform a technical solution in the embodiment of the method shown in FIG. 2, and has a similar implementation principle and technical effect, which are no longer elaborated herein.

In the network side device provided in this embodiment, a generation module generates capability indication information, and a sending module sends the capability indication information to a UE, so that before initiating a random access process, the UE identifies a capability of the network side device, and when identifying that the network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

Figure 6:
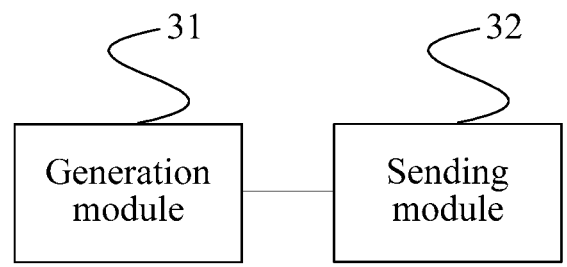
FIG. 6 is a schematic structural diagram of Embodiment 1 of a core network device according to the present disclosure.

FIG. 6 is a schematic structural diagram of Embodiment 1 of a core network device according to the present disclosure. As shown in FIG. 6, the core network device in this embodiment may include: a generation module 31 and a sending module 32. The generation module 31 is configured to generate reselection configuration information, where the reselection configuration information includes information about a network side device that supports LC-MTC. The sending module 32 is configured to send the reselection configuration information to user equipment UE, so that the UE preferentially selects the network side device in the reselection configuration information for access.

Furthermore, the core network device may further include a receiving module and a processing module. The receiving module is configured to receive NAS signaling that is sent by the UE and carries a release request. The processing module is configured to perform a release procedure on a network side according to the NAS signaling.

Furthermore, the receiving module is further configured to receive a setup request message or configuration update message sent by the network side device, where the setup request message or configuration update message carries an identifier of the network side device that supports LC-MTC. The generation module 31 is specifically configured to save the identifier of the network side device that supports LC-MTC, and generate the reselection configuration information including the identifier.

The core network device in this embodiment may be configured to perform a technical solution in the embodiment of the method shown in FIG. 3, and has a similar implementation principle and technical effect, which are no longer elaborated herein.

In the core network device provided in this embodiment, a generation module generates reselection configuration information including information about a network side device that supports LC-MTC, and next, a sending module sends the reselection configuration information to a UE, so that the UE preferentially selects the network side device in the reselection configuration information for access. In this way, the UE may be prevented from reselection to a network side device that does not support LC-MTC. Therefore, a problem that a capability mismatch occurs between a UE and a network side device is avoided, and a waste of authorized resources, extra power consumption of a UE, and an interruption of data transmission are avoided.

A communications system provided in an embodiment of the present invention includes the user equipment shown in FIG. 4, the network side device shown in FIG. 5, and the core network device shown in FIG. 6.

Figure 7:
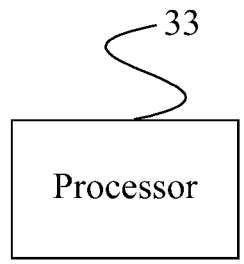
FIG. 7 is a schematic structural diagram of Embodiment 2 of user equipment according to the present disclosure.

FIG. 7 is a schematic structural diagram of Embodiment 2 of user equipment according to the present disclosure. As shown in FIG. 7, the user equipment in this embodiment may include a processor 33. The processor 33 is configured to: before a random access process is initiated, identify a capability of a network side device. The processor 73 is further configured to: when an identification module identifies that the network side device is a network side device that does not support LC-MTC, reselect to access another network side device.

In a first possible implementation manner, the processor 33 is configured to determine whether a master information block MIB in a PBCH carries capability indication information, where the capability indication information includes: a capability indication that the network side device supports LC-MTC or a version number of the network side device.

In a second possible implementation manner, the processor 33 is configured to determine whether an SIB in a PDSCH carries capability indication information, where the capability indication information includes any one or a combination of the following: a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a RACH channel configuration message, where the RACH channel configuration message includes LC-MTC type dedicated configuration information; and a PRACH channel configuration message, where the PRACH channel configuration message includes LC-MTC type dedicated configuration information.

In a third possible implementation manner, the processor 33 is configured to determine whether any one of the following is met in received scheduling information:

a resource block scheduled by the scheduling information is greater than 1000 bits; a downlink resource scheduled by the scheduling information is greater than a 1.4 MHz bandwidth; and a quantity of layers scheduled by the scheduling information is greater than 1.

Furthermore, the user equipment further includes a transmitter. The transmitter is configured to: before the processor 33 selects to access another network side device, send NAS signaling carrying a release request to a core network device, so that the core network device performs, after receiving the release request, a release procedure on a network side.

Furthermore, the user equipment further includes a receiver. The receiver is configured to: after the transmitter sends the NAS signaling carrying the release request to the core network device, receive reselection configuration information sent by the core network device, where the reselection configuration information includes information about a network side device that supports LC-MTC. The processor 33 is configured to preferentially select the network side device in the reselection configuration information for access.

In the foregoing implementation, the processor 33 is further configured to: before reselecting to access another network side device, identify the network side device as a forbidden network side device.

The user equipment in this embodiment may be configured to perform a technical solution in the embodiment of the method shown in FIG. 1, and has a similar implementation principle, which is no longer elaborated herein.

In the user equipment provided in this embodiment, before initiating a random access process, a processor identifies a capability of a network side device, and when identifying that the network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

FIG. 8 is a schematic structural diagram of Embodiment 2 of a network side device according to the present disclosure. As shown in FIG. 8, the network side device in this embodiment may include a processor 41 and a transmitter 42. The processor 41 is configured to generate capability indication information. The transmitter 42 is configured to send the capability indication information to user equipment UE, so that when identifying that the network side device is a network side device that does not support LC-MTC, the UE reselects to access another network side device.

In a first possible implementation manner, the capability indication information is carried in a MIB, where the capability indication information includes: a capability indication that the network side device supports LC-MTC or a version number of the network side device.

In a second possible implementation manner, the capability indication information is carried in an SIB, where the capability indication information includes any one or a combination of the following:

a capability indication that the network side device supports LC-MTC; a version number of the network side device; an access type block parameter, where the access type block parameter includes an LC-MTC type and an access parameter corresponding to the LC-MTC type; an enhanced access type block parameter, where the enhanced access type block parameter includes an LC-MTC type and an access parameter corresponding to the LC-MTC type; a RACH channel configuration message, where the RACH channel configuration message includes LC-MTC type dedicated configuration information; and a PRACH channel configuration message, where the PRACH channel configuration message includes LC-MTC type dedicated configuration information.

In a third possible implementation manner, the capability indication information is scheduling information, where the scheduling information meets any one of the following:

a resource block scheduled by the scheduling information is greater than 1000 bits; a downlink resource scheduled by the scheduling information is greater than a 1.4 MHz bandwidth; and a quantity of layers scheduled by the scheduling information is greater than 1.

In the foregoing embodiment, the transmitter 42 is further configured to send a setup request message or configuration update message to a core network device, where the setup request message or configuration update message carries an identifier of a network side device that supports LC-MTC, so that the core network device saves the identifier of the network side device that supports LC-MTC, and sends reselection configuration information including the identifier to the UE.

The network side device in this embodiment may be configured to perform a technical solution in the embodiment of the method shown in FIG. 2, and has a similar implementation principle and technical effect, which are no longer elaborated herein.

In the network side device provided in this embodiment, a processor generates capability indication information, and a transmitter sends the capability indication information to a UE, so that before initiating a random access process, the UE identifies a capability of the network side device, and when identifying that the network side device is a network side device that does not support LC-MTC, the UE reselects to access another network side device. In this way, a problem that a capability mismatch occurs between a UE and a network side device is avoided, and a waste of authorized resources, extra power consumption of a UE, and an interruption of data transmission are avoided.

FIG. 9 is a schematic structural diagram of Embodiment 2 of a core network device according to the present disclosure. As shown in FIG. 9, the core network device in this embodiment may include a processor 51 and a transmitter 52. The processor 51 is configured to generate reselection configuration information, where the reselection configuration information includes information about a network side device that supports LC-MTC. The transmitter 52 is configured to send the reselection configuration information to user equipment UE, so that the UE preferentially selects the network side device in the reselection configuration information for access.

Furthermore, the core network device may further include a receiver. The receiver is configured to receive NAS signaling that is sent by the UE and carries a release request. The processor 51 is further configured to perform a release procedure on a network side according to the NAS signaling.

Furthermore, the receiver is further configured to receive a setup request message or configuration update message sent by the network side device, where the setup request message or configuration update message carries an identifier of the network side device that supports LC-MTC. The processor 51 is specifically configured to save the identifier of the network side device that supports LC-MTC, and generate the reselection configuration information including the identifier.

The core network device in this embodiment may be configured to perform a technical solution in the embodiment of the method shown in FIG. 3, and has a similar implementation principle and technical effect, which are no longer elaborated herein.

In the core network device provided in this embodiment, a processor generates reselection configuration information including information about a network side device that supports LC-MTC, and next, a transmitter sends the reselection configuration information to a UE, so that the UE preferentially selects the network side device in the reselection configuration information for access. In this way, the UE may be prevented from reselection to a network side device that does not support LC-MTC. Therefore, a problem that a capability mismatch occurs between a UE and a network side device is avoided, and a waste of authorized resources, extra power consumption of a UE, and an interruption of data transmission are avoided.

A communications system provided in an embodiment of the present invention includes the user equipment as shown in FIG. 7, the network side device as shown in FIG. 8, and the core network device as shown in FIG. 9.

FIG. 10 is a flowchart of Embodiment 4 of a capability matching method according to the present disclosure. In this embodiment, an example in which a network side device executes the method is used for description. As shown in FIG. 10, the method in this embodiment may include:

S401: The network side device acquires capability indication information, where the capability indication information is used for indicating whether a neighboring cell of the network side device supports LC-MTC.

A manner in which the network side device acquires the capability indication information may be, for example: in a process of establishing an X2 interface between the network side device and another network side device, exchanging, by the network side device and the another network side device, information about whether cells under respective coverage support LC-MTC. In this way, the network side devices may obtain whether neighboring cells of the network side devices support LC-MTC.

S402: The network side device sends a broadcast message to a UE, where the broadcast message includes the capability indication information, so that when a UE that supports LC-MTC in the network side device performs cell reselection measurement when the UE is in an idle state, the UE measures, according to the capability indication information, only a cell that supports LC-MTC. In this way, ineffective measurement may be reduced, and power is saved for the UE, and when the UE that supports LC-MTC in the network side device performs cell reselection in an idle state, the UE performs reselection, according to the capability indication information, only to a cell that supports LC-MTC. In this way, the UE that supports LC-MTC in the network side device may be prevented from being selected to a cell that does not support LC-MTC during cell reselection. In this way, a problem that a capability mismatch occurs between a UE and a network side device is avoided, and a waste of authorized resources, extra power consumption of a UE, and an interruption of data transmission are avoided.

In the capability matching method provided in this embodiment of the present invention, a network side device sends a broadcast message to a UE, where the broadcast message includes capability indication information indicating whether a neighboring cell of the network side device supports LC-MTC, so that when performing cell reselection in an idle state, the UE performs reselection, according to the capability indication information, only to a cell that supports LC-MTC. In this way, a problem that a capability mismatch occurs between a UE and a network side device is avoided, and a waste of authorized resources, extra power consumption of a UE, and an interruption of data transmission are avoided.

Figure 11:
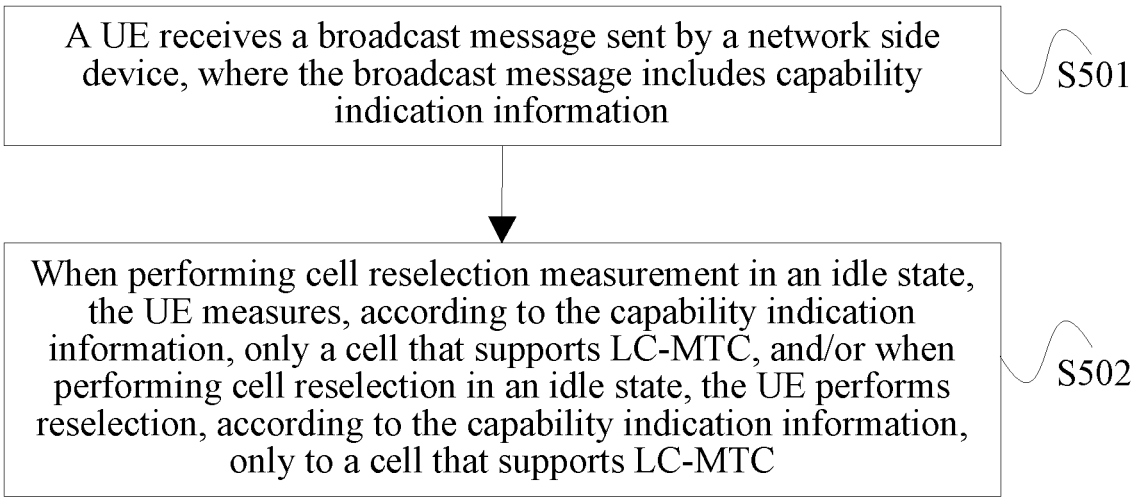
FIG. 11 is a flowchart of Embodiment 5 of a capability matching method according to the present disclosure.

FIG. 11 is a flowchart of Embodiment 5 of a capability matching method according to the present disclosure. In this embodiment, an example in which user equipment executes the method is used for description. As shown in FIG. 11, the method in this embodiment may include:

S501: The UE receives a broadcast message sent by a network side device, where the broadcast message includes capability indication information, and the capability indication information is used for indicating whether a neighboring cell of the network side device supports LC-MTC.

A manner in which the network side device acquires the capability indication information may be, for example: in a process of establishing an X2 interface between the network side device and another network side device, exchanging, by the network side device and the another network side device, information about whether cells under respective coverage support LC-MTC. In this way, the network side devices may obtain whether neighboring cells of the network side devices support LC-MTC.

S502: When performing cell reselection measurement in an idle state, the UE measures, according to the capability indication information, only a cell that supports LC-MTC, and/or when performing cell reselection in an idle state, the UE performs reselection, according to the capability indication information, only to a cell that supports LC-MTC.

When performing cell reselection measurement in an idle state, the UE measures, according to the capability indication information, only a cell that supports LC-MTC. In this way, ineffective measurement may be reduced, and power is saved for the UE.

In the capability matching method provided in this embodiment of the present invention, a UE receives a broadcast message sent by a network side device, where the broadcast message includes capability indication information indicating whether a neighboring cell of the network side device supports LC-MTC, and when performing cell reselection in an idle state, the UE performs reselection, according to the capability indication information, only to a cell that supports LC-MTC. In this way, a problem that a capability mismatch occurs between a UE and a network side device is avoided, and a waste of authorized resources, extra power consumption of a UE, and an interruption of data transmission are avoided.

Figure 12:
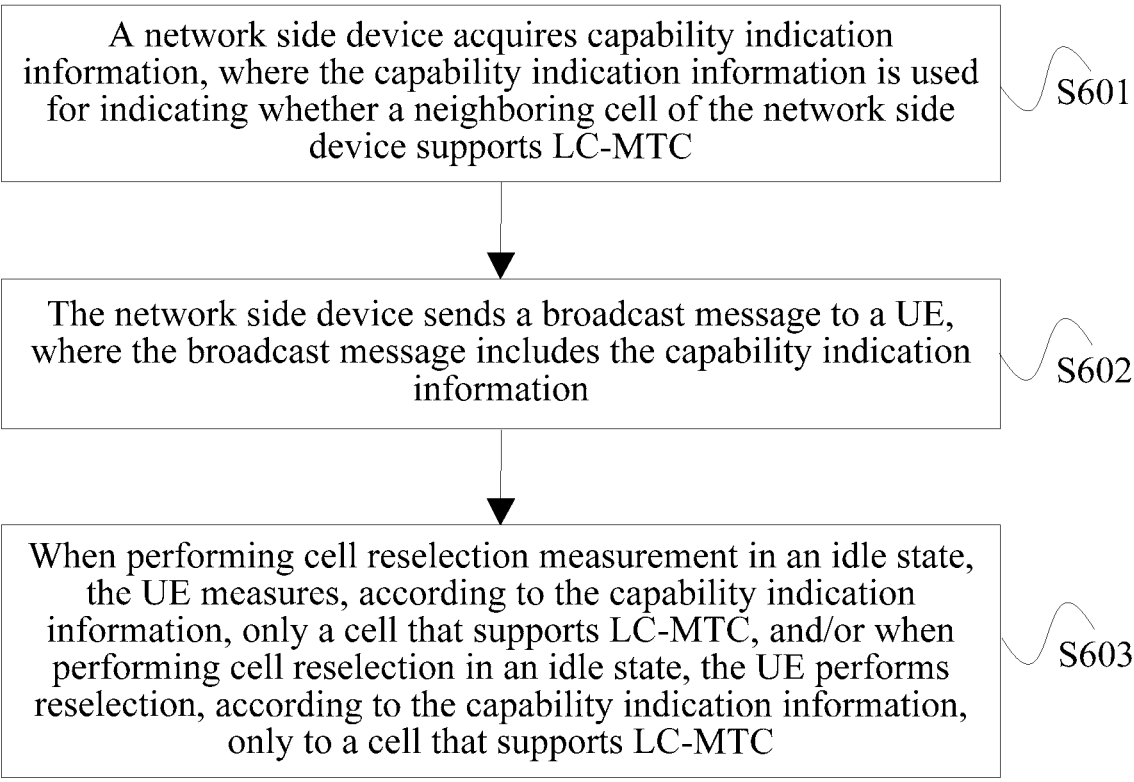
FIG. 12 is a flowchart of interaction of Embodiment 6 of a capability matching method according to the present disclosure.

FIG. 12 is a flowchart of interaction of Embodiment 6 of a capability matching method according to the present disclosure. As shown in FIG. 12, the method in this embodiment may include:

S601: A network side device acquires capability indication information, where the capability indication information is used for indicating whether a neighboring cell of the network side device supports LC-MTC.

A manner in which the network side device acquires the capability indication information may be, for example: in a process of establishing an X2 interface between the network side device and another network side device, exchanging, by the network side device and the another network side device, information about whether cells under respective coverage support LC-MTC. In this way, the network side devices may obtain whether neighboring cells of the network side devices support LC-MTC.

S602: The network side device sends a broadcast message to a UE, where the broadcast message includes the capability indication information.

S603: When performing cell reselection measurement in an idle state, the UE measures, according to the capability indication information, only a cell that supports LC-MTC, and/or when performing cell reselection in an idle state, the UE performs reselection, according to the capability indication information, only to a cell that supports LC-MTC.

Figure 13:
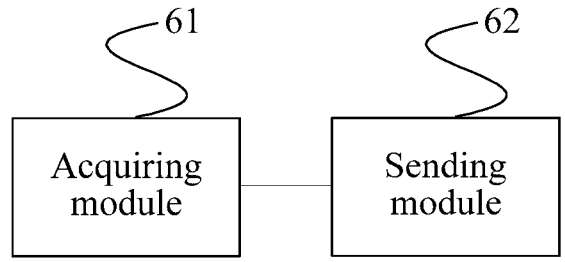
FIG. 13 is a schematic structural diagram of Embodiment 3 of a network side device according to the present disclosure.

FIG. 13 is a schematic structural diagram of Embodiment 3 of a network side device according to the present disclosure. As shown in FIG. 13, an apparatus in this embodiment may include an acquiring module 61 and a sending module 62. The acquiring module 61 is configured to acquire capability indication information, where the capability indication information is used for indicating whether a neighboring cell of the network side device supports LC-MTC. The sending module 62 is configured to send a broadcast message to a UE, where the broadcast message includes the capability indication information, so that when a UE that supports LC-MTC in the network side device performs cell reselection measurement when the UE is in an idle state, the UE measures, according to the capability indication information, only a cell that supports LC-MTC, and when the UE that supports LC-MTC in the network side device performs cell reselection in an idle state, the UE performs reselection, according to the capability indication information, only to a cell that supports LC-MTC.

Furthermore, the acquiring module 61 is configured to: in a process of establishing an X2 interface with another network side device, exchange information about whether cells under respective coverage support LC-MTC.

The network side device in this embodiment may be configured to perform a technical solution in the embodiment of the method shown in FIG. 10, and has a similar implementation principle and technical effect, which are no longer elaborated herein.

In the network side device provided in this embodiment of the present invention, a sending module sends a broadcast message to a UE, where the broadcast message includes capability indication information indicating whether a neighboring cell of the network side device supports LC-MTC, so that when performing cell reselection in an idle state, the UE performs reselection, according to the capability indication information, only to a cell that supports LC-MTC. In this way, a problem that a capability mismatch occurs between a UE and a network side device is avoided, and a waste of authorized resources, extra power consumption of a UE, and an interruption of data transmission are avoided.

Figure 14:
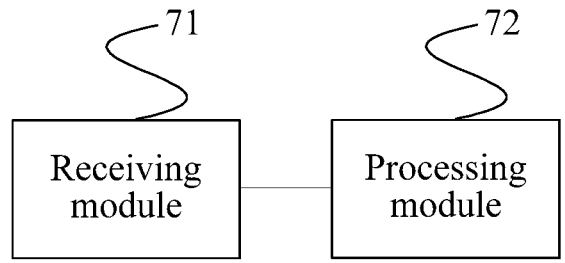
FIG. 14 is a schematic structural diagram of Embodiment 3 of user equipment according to the present disclosure.

FIG. 14 is a schematic structural diagram of Embodiment 3 of user equipment according to the present disclosure. As shown in FIG. 14, an apparatus in this embodiment may include a receiving module 71 and a processing module 72. The receiving module 71 is configured to receive a broadcast message sent by a network side device, where the broadcast message includes capability indication information about whether a neighboring cell of a current cell of the user equipment UE supports LC-MTC.

The processing module 72 is configured to: when the UE performs cell reselection measurement in an idle state, measure, according to the capability indication information, only a cell that supports LC-MTC, and/or when the UE performs cell reselection in an idle state, perform reselection, according to the capability indication information, only to a cell that supports LC-MTC.

The user equipment in this embodiment may be configured to perform a technical solution in the embodiment of the method shown in FIG. 11, and has a similar implementation principle and technical effect, which are no longer elaborated herein.

In the user equipment provided in this embodiment of the present invention, a receiving module receives a broadcast message sent by a network side device, where the broadcast message includes capability indication information indicating whether a neighboring cell of the network side device supports LC-MTC, and when performing cell reselection in an idle state, a processing module reselects, according to the capability indication information, only to a cell that supports LC-MTC. In this way, a problem that a capability mismatch occurs between a UE and a network side device is avoided, and a waste of authorized resources, extra power consumption of a UE, and an interruption of data transmission are avoided.

A communications system provided in an embodiment of the present invention includes the network side device as shown in FIG. 13 and the user equipment as shown in FIG. 14.

Figure 15:
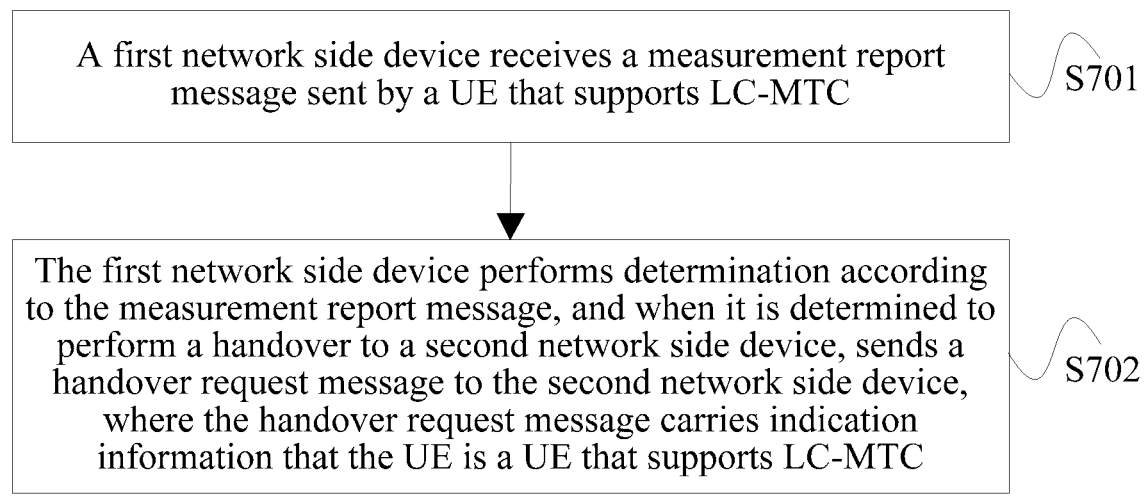
FIG. 15 is a flowchart of Embodiment 7 of a capability matching method according to the present disclosure.

FIG. 15 is a flowchart of Embodiment 7 of a capability matching method according to the present disclosure. In this embodiment, a cell handover is performed for a UE, and an example in which a network side device executes the method is used for description. As shown in FIG. 15, the method in this embodiment may include:

S701: A first network side device receives a measurement report message sent by a UE that supports LC-MTC.

S702: The first network side device performs determination according to the measurement report message, and when it is determined to perform a handover to a second network side device, sends a handover request message to the second network side device, where the handover request message carries indication information that UE is a UE that supports LC-MTC, so that according to the indication information, the second network side device returns a handover request acknowledgment message when LC-MTC is supported, or returns a handover request failure message when LC-MTC is not supported.

Specifically, the first network side device sends the handover request message to the second network side device, where the handover request message carries indication information that UE is a UE that supports LC-MTC, and after receiving the handover request message, the second network side device may, according to the indication information, return the handover request acknowledgment message when LC-MTC is supported, or return the handover request failure message when LC-MTC is not supported. Therefore, the UE that supports LC-MTC may be prevented from being handed over to a cell that does not support LC-MTC.

In the capability matching method provided in this embodiment of the present invention, when it is determined according to a measurement report message to perform a handover to a second network side device, a first network side device sends a handover request message to the second network side device, where the handover request message carries indication information that UE is a UE that supports LC-MTC, and after receiving the handover request message, the second network side device may, according to the indication information, return a handover request acknowledgment message when LC-MTC is supported, or return a handover request failure message when LC-MTC is not supported. Therefore, the UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

FIG. 16 is a flowchart of Embodiment 8 of a capability matching method according to the present invention. In this embodiment, a cell handover is performed for a UE, and an example in which a network side device executes the method is used for description. As shown in FIG. 16, the method in this embodiment may include:

S801: A second network side device receives a handover request message sent by a first network side device, where the handover request message carries indication information that a UE is a UE that supports LC-MTC.

S802: According to the indication information, the second network side device returns a handover request acknowledgment message when LC-MTC is supported, or returns a handover request failure message when LC-MTC is not supported.

In the capability matching method provided in this embodiment of the present invention, when it is determined according to a measurement report message to perform a handover to a second network side device, a first network side device sends a handover request message to the second network side device, where the handover request message carries indication information that a UE is a UE that supports LC-MTC, and after receiving the handover request message, the second network side device, according to the indication information, returns a handover request acknowledgment message when LC-MTC is supported, or returns a handover request failure message when LC-MTC is not supported. Therefore, the UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

FIG. 17 is a flowchart of interaction of Embodiment 9 of a capability matching method according to the present disclosure. As shown in FIG. 17, the method in this embodiment may include:

S901: A first network side device receives a measurement report message sent by a UE that supports LC-MTC.

S902: The first network side device performs determination according to the measurement report message, and when it is determined to perform a handover to a second network side device, sends a handover request message to the second network side device, where the handover request message carries indication information that UE is a UE that supports LC-MTC.

S903: According to the indication information, the second network side device returns a handover request acknowledgment message when LC-MTC is supported, or returns a handover request failure message when LC-MTC is not supported.

FIG. 18 is a schematic structural diagram of Embodiment 4 of a network side device according to the present disclosure. As shown in FIG. 18, the network side device in this embodiment may include a receiving module 81, a processing module 82, and a sending module 83. The receiving module 81 is configured to receive a measurement report message sent by user equipment UE that supports LC-MTC. The processing module 82 is configured to perform determination according to the measurement report message. The sending module 83 is configured to: when the processing module determines to perform a handover to a second network side device, send a handover request message to the second network side device, where the handover request message carries indication information that UE is a UE that supports LC-MTC, so that according to the indication information, the second network side device returns a handover request acknowledgment message when LC-MTC is supported, or returns a handover request failure message when LC-MTC is not supported.

In the network side device provided in this embodiment of the present invention, when a processing module determines, according to a measurement report message, to perform a handover to a second network side device, a sending module sends a handover request message to the second network side device, where the handover request message carries indication information that a UE is a UE that supports LC-MTC, and after receiving the handover request message, the second network side device may, according to the indication information, return a handover request acknowledgment message when LC-MTC is supported, or returns a handover request failure message when LC-MTC is not supported. Therefore, the UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

Figure 19:
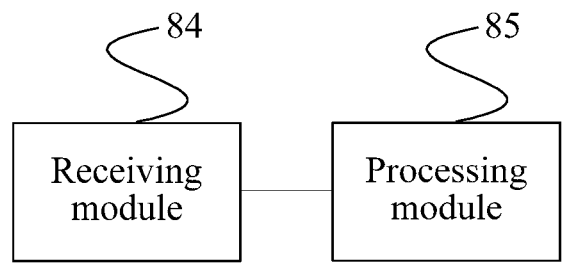
FIG. 19 is a schematic structural diagram of Embodiment 5 of a network side device according to the present disclosure.

FIG. 19 is a schematic structural diagram of Embodiment 5 of a network side device according to the present disclosure. As shown in FIG. 19, the network side device in this embodiment may include a receiving module 84 and a processing module 85. The receiving module 84 is configured to receive a handover request message sent by a first network side device, where the handover request message carries indication information that a UE is a UE that supports LC-MTC. The processing module 85 is configured to, according to the indication information, return a handover request acknowledgment message when LC-MTC is supported, or return a handover request failure message when LC-MTC is not supported.

In the network side device provided in this embodiment of the present invention, after a receiving module receives a handover request message sent by a first network side device, according to the indication information, a processing module returns a handover request acknowledgment message when LC-MTC is supported, or returns a handover request failure message when LC-MTC is not supported. Therefore, a UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

Figure 20:
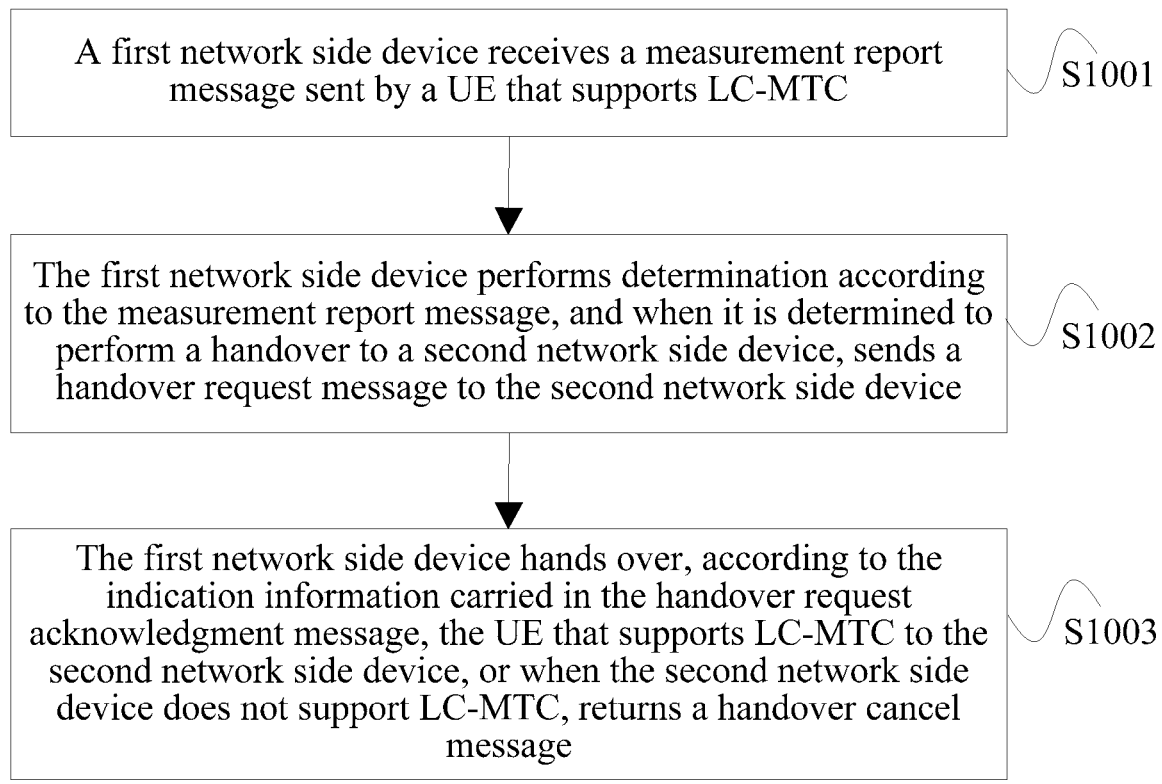
FIG. 20 is a flowchart of Embodiment 10 of a capability matching method according to the present disclosure.

FIG. 20 is a flowchart of Embodiment 10 of a capability matching method according to the present disclosure. In this embodiment, a cell handover is performed for a UE, and an example in which a network side device executes the method is used for description. As shown in FIG. 20, the method in this embodiment may include:

S1001: A first network side device receives a measurement report message sent by a UE that supports LC-MTC.

S1002: The first network side device performs determination according to the measurement report message, and when it is determined to perform a handover to a second network side device, sends a handover request message to the second network side device, so that the second network side device returns a handover request acknowledgment message to the first network side device according to the handover request message, where the handover request acknowledgment message carries indication information about whether the second network side device supports LC-MTC.

S1003: The first network side device hands over, according to the indication information carried in the handover request acknowledgment message, the UE that supports LC-MTC to the second network side device, or, when the second network side device does not support LC-MTC, returns a handover cancel message.

Specifically, according to the indication information carried in the handover request acknowledgment message, when the second network side device supports LC-MTC, the first network side device hands over the UE that supports LC-MTC to the second network side device; or when the second network side device does not support LC-MTC, the first network side device returns a handover cancel message. In this way, the UE that supports LC-MTC may be prevented from being handed over to a cell that does not support LC-MTC.

In the capability matching method provided in this embodiment of the present invention, when it is determined according to a measurement report message to perform a handover to a second network side device, a first network side device sends a handover request message to the second network side device, and the second network side device returns a handover request acknowledgment message to the first network side device, where the handover request acknowledgment message carries indication information about whether the second network side device supports LC-MTC, so that according to the indication information carried in the handover request acknowledgment message, when the second network side device supports LC-MTC, the first network side device hands over a UE that supports LC-MTC to the second network side device; or when the second network side device does not support LC-MTC, the first network side device returns a handover cancel message. Therefore, the UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

Figure 21:
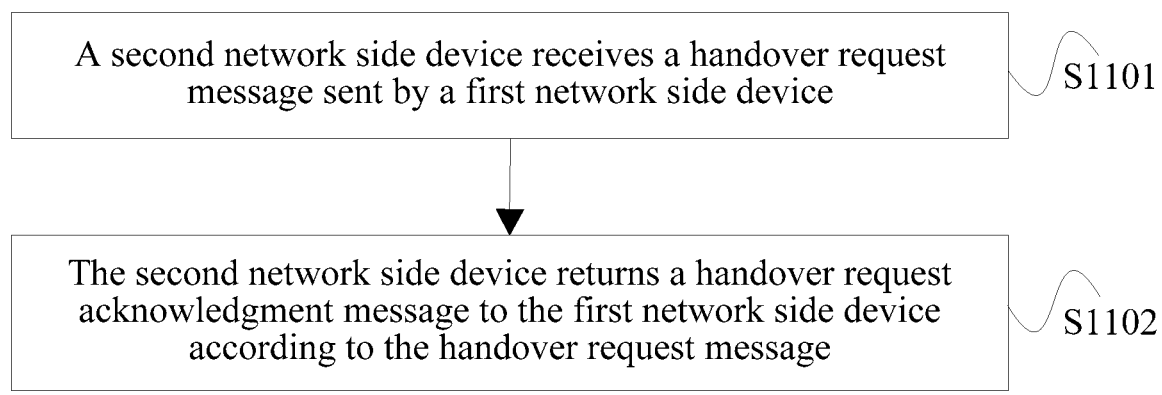
FIG. 21 is a flowchart of Embodiment 11 of a capability matching method according to the present disclosure.

FIG. 21 is a flowchart of Embodiment 11 of a capability matching method according to the present disclosure. In this embodiment, a cell handover is performed for a UE, and an example in which a network side device executes the method is used for description. As shown in FIG. 21, the method in this embodiment may include:

S1101: A second network side device receives a handover request message sent by a first network side device.

S1102: The second network side device returns a handover request acknowledgment message to the first network side device according to the handover request message, where the handover request acknowledgment message carries indication information about whether the second network side device supports LC-MTC, so that the first network side device continues, according to the indication information carried in the handover request acknowledgment message, to hand over a UE that supports LC-MTC to the second network side device, or when the second network side device does not support LC-MTC, return a handover cancel message.

In the capability matching method provided in this embodiment of the present invention, a second network side device receives a handover request message sent by a first network side device, and next, returns a handover request acknowledgment message to the first network side device, where the handover request acknowledgment message carries indication information about whether the second network side device supports LC-MTC, so that according to the indication information carried in the handover request acknowledgment message, when the second network side device supports LC-MTC, the first network side device hands over a UE that supports LC-MTC to the second network side device; or when the second network side device does not support LC-MTC, the first network side device returns a handover cancel message. Therefore, the UE that supports LC-MTC may be prevented from being handed over to a cell that does not support LC-MTC.

Therefore, a problem that a capability mismatch occurs between a UE and a network side device is avoided, and a waste of authorized resources, extra power consumption of a UE, and an interruption of data transmission are avoided.

Figure 22:
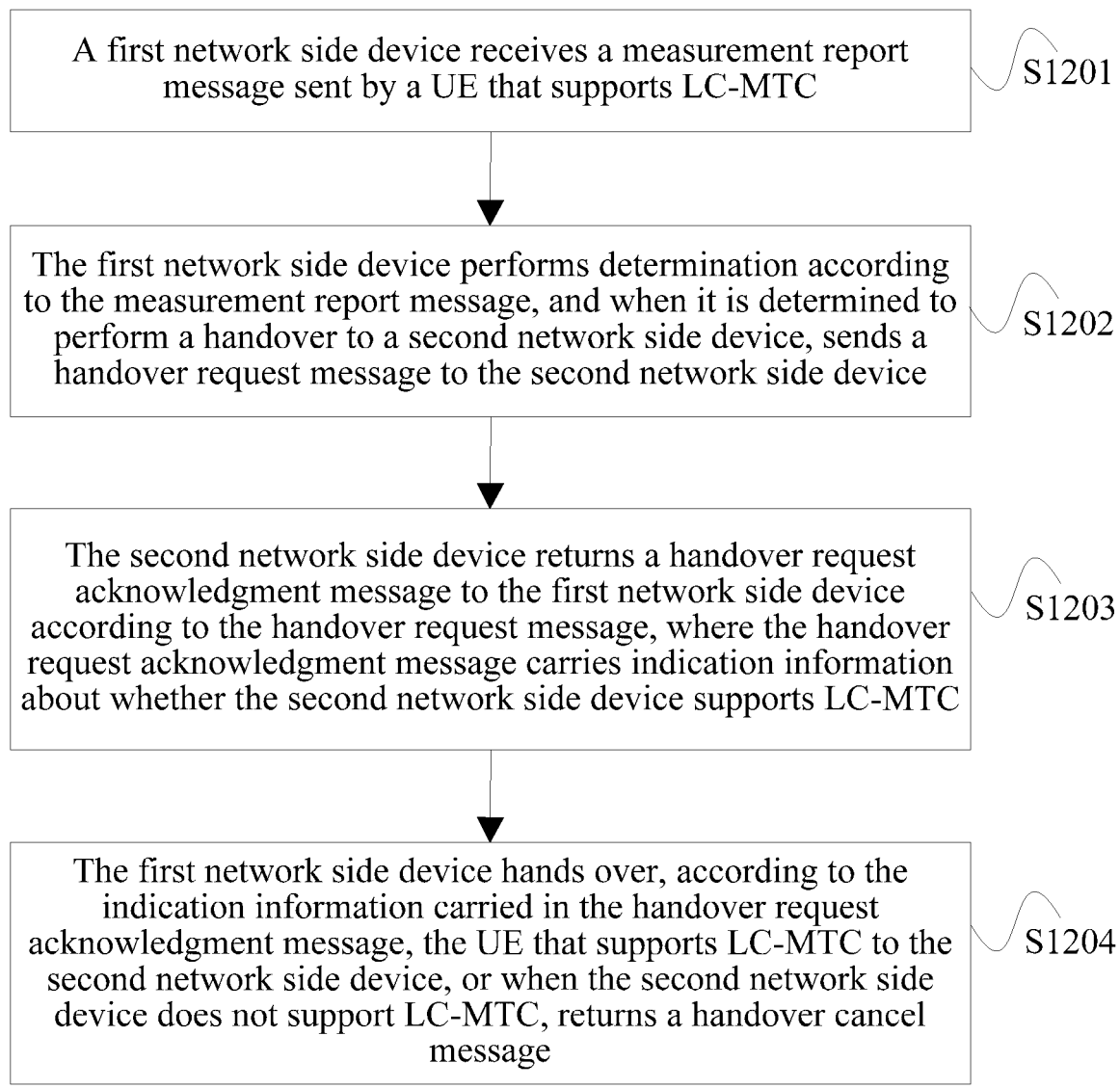
FIG. 22 is a flowchart of interaction of Embodiment 12 of a capability matching method according to the present disclosure.

FIG. 22 is a flowchart of interaction of Embodiment 12 of a capability matching method according to the present disclosure. As shown in FIG. 22, the method in this embodiment may include:

S1201: A first network side device receives a measurement report message sent by a UE that supports LC-MTC.

S1202: The first network side device performs determination according to the measurement report message, and when it is determined to perform a handover to a second network side device, sends a handover request message to the second network side device.

S1203: The second network side device returns a handover request acknowledgment message to the first network side device according to the handover request message, where the handover request acknowledgment message carries indication information about whether the second network side device supports LC-MTC.

S1204: The first network side device hands over, according to the indication information carried in the handover request acknowledgment message, the UE that supports LC-MTC to the second network side device, or, when the second network side device does not support LC-MTC, returns a handover cancel message.

Figure 23:
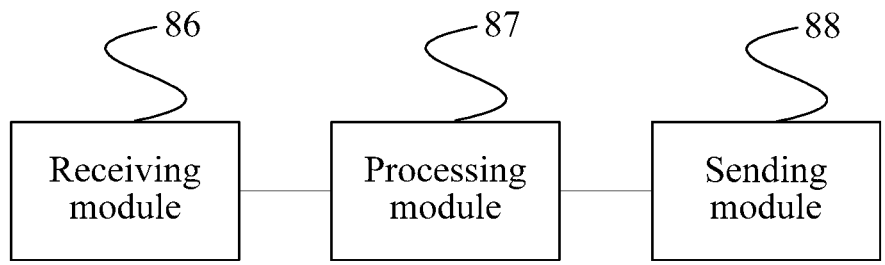
FIG. 23 is a schematic structural diagram of Embodiment 6 of a network side device.

FIG. 23 is a schematic structural diagram of Embodiment 6 of a network side device. As shown in FIG. 23, the network side device in this embodiment may include: a receiving module 86, a processing module 87, and a sending module 88. The receiving module 86 is configured to receive a measurement report message sent by user equipment UE that supports low cost machine type communication LC-MTC. The processing module 87 is configured to perform determination according to the measurement report message. The sending module 88 is configured to: when the processing module determines to perform a handover to a second network side device, send a handover request message to the second network side device, so that the second network side device returns a handover request acknowledgment message to a first network side device according to the handover request message, where the handover request acknowledgment message carries indication information about whether the second network side device supports LC-MTC. The processing module 87 is further configured to continue, according to the indication information carried in the handover request acknowledgment message, to hand over the UE that supports LC-MTC to the second network side device, or, when the second network side device does not support LC-MTC, return a handover cancel message.

In the network side device provided in this embodiment of the present invention, when a processing module determines according to a measurement report message to perform a handover to a second network side device, a sending module sends a handover request message to the second network side device, so that the second network side device returns a handover request acknowledgment message to a first network side device, where the handover request acknowledgment message carries indication information about whether the second network side device supports LC-MTC, so that according to the indication information carried in the handover request acknowledgment message, when the second network side device supports LC-MTC, the processing module hands over a UE that supports LC-MTC to the second network side device; or when the second network side device does not support LC-MTC, the processing module returns a handover cancel message. Therefore, the UE that supports LC-MTC may be prevented from being handed over to a cell that does not support LC-MTC. Therefore, a problem of a capability mismatch between a UE and a network side device may be prevented from occurring, and a waste of authorized resources, extra power consumption of a UE, and an interruption of data transmission are avoided.

FIG. 24 is a schematic structural diagram of Embodiment 7 of a network side device. As shown in FIG. 24, the network side device in this embodiment may include a receiving module 90 and a sending module 91. The receiving module 90 is configured to receive a handover request message sent by a first network side device. The sending module 91 is configured to return a handover request acknowledgment message to the first network side device according to the handover request message, where the handover request acknowledgment message carries indication information about whether a second network side device supports LC-MTC, so that the first network side device continues, according to the indication information carried in the handover request acknowledgment message, to hand over a UE that supports LC-MTC to the second network side device, or when the second network side device does not support LC-MTC, return a handover cancel message.

In the network side device provided in this embodiment of the present invention, a receiving module receives a handover request message sent by a first network side device, and next, returns a handover request acknowledgment message to a sending module, where the handover request acknowledgment message carries indication information about whether a second network side device supports LC-MTC, so that according to the indication information carried in the handover request acknowledgment message, when the second network side device supports LC-MTC, the first network side device hands over a UE that supports LC-MTC to the second network side device; or when the second network side device does not support LC-MTC, the first network side device returns a handover cancel message. Therefore, the UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

FIG. 25 is a flowchart of Embodiment 13 of a capability matching method according to the present disclosure. In this embodiment, a cell handover is performed for a UE, and an example in which a network side device executes the method is used for description. As shown in FIG. 25, the method in this embodiment may include:

S1301: The network side device generates measurement configuration information, where the measurement configuration information includes a cell identifier that LC-MTC is not supported.

S1302: The network side device sends the measurement configuration information to a UE, so that the UE skips performing measurement on a cell corresponding to the cell identifier that LC-MTC is not supported included in the measurement configuration information.

Specifically, the UE skips performing measurement on a cell corresponding to the cell identifier that LC-MTC is not supported included in the measurement configuration information, and further is not handed over to a cell that does not support LC-MTC, and more power is saved for the UE.

Furthermore, before the generating, by a network side device, measurement configuration information, the method further includes:

> receiving, by the network side device, indication information sent by UE, where the indication information is used for indicating that the UE is a UE that supports LC-MTC.

In the capability matching method provided in this embodiment of the present invention, a network side device generates a cell identifier including that LC-MTC is not supported, and next, sends measurement configuration information to a UE, so that the UE skips performing measurement on a cell corresponding to the cell identifier that LC-MTC is not supported included in the measurement configuration information. Therefore, UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

FIG. 26 is a flowchart of Embodiment 14 of a capability matching method according to the present disclosure. In this embodiment, a cell handover is performed for a UE, and an example in which the UE executes the method is used for description. As shown in FIG. 26, the method in this embodiment may include:

S1401: The UE receives measurement configuration information sent by a network side device, where the measurement configuration information includes a cell identifier that LC-MTC is not supported.

S1402: The UE skips performing measurement on a cell corresponding to the cell identifier that LC-MTC is not supported included in the measurement configuration information.

Before that UE receives measurement configuration information sent by a network side device, the method further includes:

> sending, by the UE, indication information to the network side device, where the indication information is used for indicating that the UE is a UE that supports LC-MTC.

In the capability matching method provided in this embodiment of the present invention, a UE receives measurement configuration information sent by a network side device, where the measurement configuration information includes a cell identifier that LC-MTC is not supported, and the UE skips performing measurement on a cell corresponding to the cell identifier that LC-MTC is not supported included in the measurement configuration information. Therefore, UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

Figure 27:
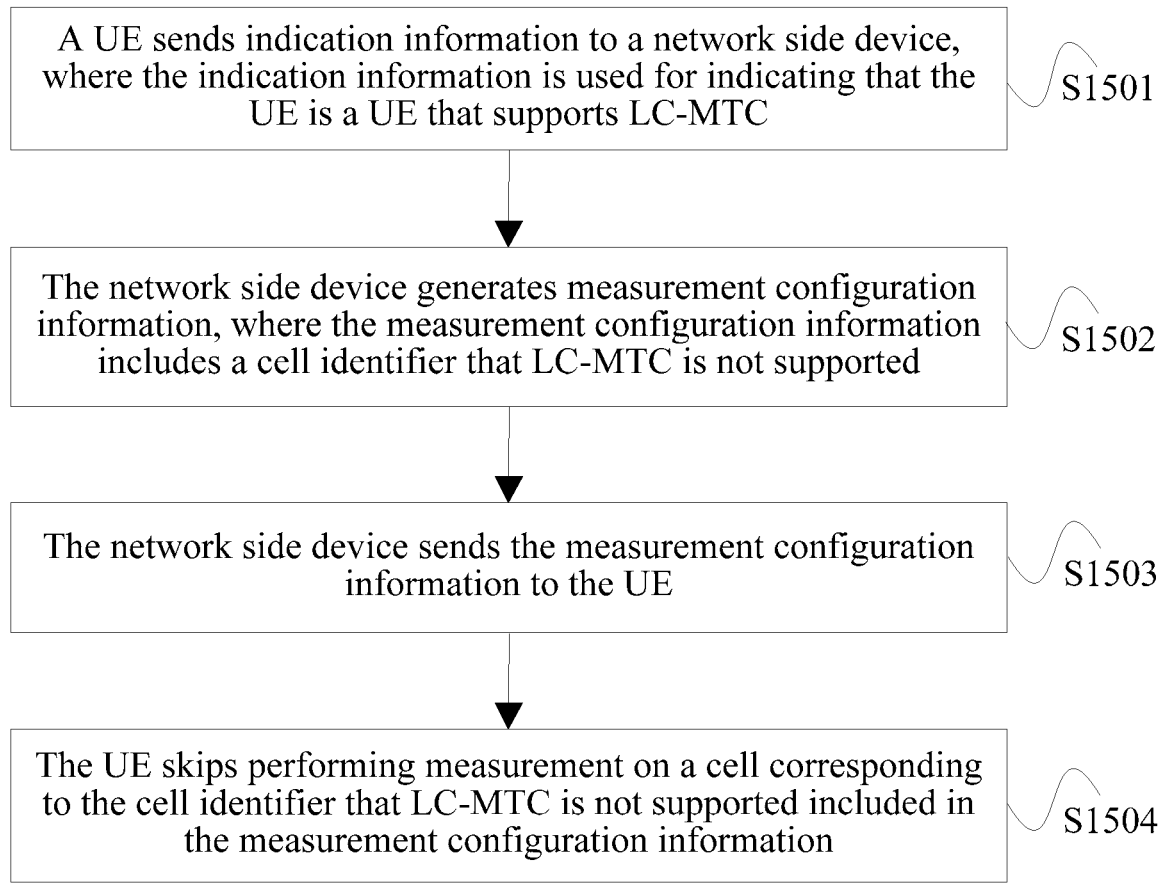
FIG. 27 is a flowchart of interaction of Embodiment 15 of a capability matching method according to the present disclosure.

FIG. 27 is a flowchart of interaction of Embodiment 15 of a capability matching method according to the present disclosure. As shown in FIG. 27, the method in this embodiment may include:

S1501: A UE sends indication information to a network side device, where the indication information is used for indicating that the UE is a UE that supports LC-MTC.

S1502: The network side device generates measurement configuration information, where the measurement configuration information includes a cell identifier that LC-MTC is not supported.

S1503: The network side device sends the measurement configuration information to the UE.

S1504: The UE skips performing measurement on a cell corresponding to the cell identifier that LC-MTC is not supported included in the measurement configuration information.

Figure 28:
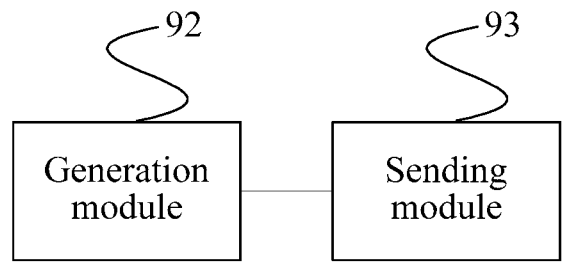
FIG. 28 is a schematic structural diagram of Embodiment 8 of a network side device.

FIG. 28 is a schematic structural diagram of Embodiment 8 of a network side device. As shown in FIG. 28, the network side device in this embodiment may include a generation module 92 and a sending module 93. The generation module 92 is configured to generate measurement configuration information, where the measurement configuration information includes a cell identifier that LC-MTC is not supported. The sending module 93 is configured to send the measurement configuration information to user equipment UE, so that the UE skips performing measurement on a cell corresponding to the cell identifier that LC-MTC is not supported included in the measurement configuration information.

Furthermore, the network side device further includes: a receiving module. The receiving module is configured to: before the generation module generates the measurement configuration information, receive indication information sent by a UE, where the indication information is used for indicating that the UE is a UE that supports LC-MTC.

In the network side device provided in this embodiment, a generation module generates including a cell identifier that LC-MTC is not supported, and next, a sending module sends measurement configuration information to a UE, so that the UE skips performing measurement on a cell corresponding to the cell identifier that LC-MTC is not supported included in the measurement configuration information. Therefore, UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

Figure 29:
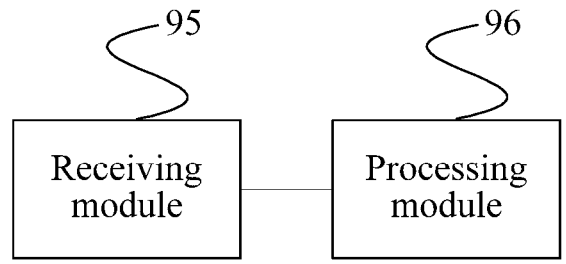
FIG. 29 is a schematic structural diagram of Embodiment 4 of user equipment.

FIG. 29 is a schematic structural diagram of Embodiment 4 of user equipment. As shown in FIG. 29, the user equipment in this embodiment may include a receiving module 95 and a processing module 96. The receiving module 95 is configured to receive measurement configuration information sent by a network side device, where the measurement configuration information includes a cell identifier that LC-MTC is not supported. The processing module 96 is configured to skip performing measurement on a cell corresponding to the cell identifier that LC-MTC is not supported included in the measurement configuration information.

Furthermore, the user equipment further includes: a sending module. The sending module is configured to: before the receiving module receives the measurement configuration information sent by the network side device, send indication information to the network side device, where the indication information is used for indicating that the UE is a UE that supports LC-MTC.

In the user equipment provided in this embodiment of the present invention, a receiving module receives measurement configuration information sent by a network side device, where the measurement configuration information includes a cell identifier that LC-MTC is not supported, and a processing module skips performing measurement on a cell corresponding to the cell identifier that LC-MTC is not supported included in the measurement configuration information. Therefore, a UE that supports LC-MTC may be prevented from being handed over to a cell that does not support LC-MTC. Therefore, a problem that a capability mismatch occurs between a UE and a network side device is avoided, and a waste of authorized resources, extra power consumption of a UE, and an interruption of data transmission are avoided.

A communications system provided in an embodiment of the present invention includes the network side device shown in FIG. 26 and the user equipment shown in FIG. 27.

In the prior art, a UE that supports LC-MTC is a special type of UE, has a lower cost as compared with an ordinary UE, and has features including: (1) a single radio-frequency receive chain; (2) an uplink/downlink transport block is less than 1000 bits; and (3) only baseband data in a 1.4 M bandwidth can be received. Because LC-MTC only supports a 1.4 MHz bandwidth and each subframe can receive only data not greater than a threshold (for example, 1000 bits), when at least two of content of the following type, for example, an MIB, an SIB, a paging message, a RAR, and service data need to be received, a UE that supports LC-MTC cannot receive the content, which is a problem to be solved.

When a UE needs to receive content of at least two types on a same subframe, an embodiment of the present invention provides a solution, and this embodiment of the present invention proposes a message receiving method, where the method is:

1. If to-be-received content of at least two types includes a master information block, the master information block is received. Alternatively, 2. Content having a highest priority level is received according to the following priority level order.

The priority level order is any one of the following:
master information block>system information block>random access response>paging message>service data
random access response>paging message>master information block>system information block>service data
paging message>random access response>master information block>system information block>service data. Alternatively, 3. Perform reception one by one according to the following priority level order until a transmission bandwidth corresponding to accumulated received content exceeds 1.4 MHz or a size of accumulated received content exceeds a receivable data threshold.

The priority level order is any one of the following:
master information block>system information block>random access response>paging message>service data
random access response>paging message>master information block>system information block>service data
paging message>random access response>master information block>system information block>service data.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A capability matching method in a network, the method comprising:
  receiving, by a user equipment (UE), a broadcast message from a network side device;
  receiving, by the UE, scheduling information after the UE is in a connected state with the network side device and prior to initiating a random access process with the network side device, wherein the scheduling information includes information about a resource block, a downlink resource and a quantity of layers;
  determining, by the UE, the network side device does not support low cost machine type communication (LC-MTC) if any of the following conditions is met in the scheduling information received by the UE:
    a) the resource block scheduled by the scheduling information is greater than 1000 bits;
    b) the downlink resource scheduled by the scheduling information is greater than a 1.4 MHz bandwidth; and
    c) the quantity of layers scheduled by the scheduling information is greater than 1; and
  reselecting, by the UE, another broadcast message from another network side device when any of the conditions are met.

2. The method according to claim 1, before the reselecting, by the UE, to access another network side device, further comprising:
  identifying, by the UE, the network side device as a forbidden network side device.

3. A user equipment in a network, the user equipment comprising:
  a processor and a non-transitory computer readable medium containing instructions that, when executed by the processor, cause the processor to provide the following operations:
    receiving a broadcast message from a network side device;
    receiving scheduling information after the UE is in a connected state with the network side device and prior to initiating a random access process with the network side device, wherein the scheduling information includes information about a resource block, a downlink resource and a quantity of layers;
    determining the network side device does not support low cost machine type communication (LC-MTC) if any one of the following conditions is met in scheduling information received by the user equipment:

a) the resource block scheduled by the scheduling information is greater than 1000 bits;
b) the downlink resource scheduled by the scheduling information is greater than a 1.4 MHz bandwidth; and
c) the quantity of layers scheduled by the scheduling information is greater than 1; and reselect another broadcast message from another network side device when any of the conditions are met.

4. The user equipment according to claim 3, wherein the processor is further configured to:

before reselecting to access another network side device, identify the network side device as a forbidden network side device.

\* \* \* \* \*

UNITED STATES PATENT AND TRADEMARK OFFICE
CERTIFICATE OF CORRECTION

PATENT NO. : 10,575,246 B2  
APPLICATION NO. : 15/080309  
DATED : February 25, 2020  
INVENTOR(S) : Hu et al.

Page 1 of 1

It is certified that error appears in the above-identified patent and that said Letters Patent is hereby corrected as shown below:

On the Title Page

Item [56], "AL 2592873" should read -- EP 2592873 --

Signed and Sealed this
Twenty-eighth Day of July, 2020

Andrei Iancu
*Director of the United States Patent and Trademark Office*